(12) United States Patent
Kazama et al.

(10) Patent No.: US 9,310,130 B2
(45) Date of Patent: Apr. 12, 2016

(54) METHOD AND APPARATUS FOR DRYING ELECTRODE MATERIAL

(75) Inventors: Shigenori Kazama, Sagamihara (JP); Akikazu Itou, Isehara (JP); Tomoyuki Natsume, Yokohama (JP); Yusuke Tateyama, Sagamihara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 1281 days.

(21) Appl. No.: 12/997,470

(22) PCT Filed: Jul. 30, 2009

(86) PCT No.: PCT/IB2009/006408
§ 371 (c)(1),
(2), (4) Date: Dec. 10, 2010

(87) PCT Pub. No.: WO2010/015908
PCT Pub. Date: Feb. 11, 2010

(65) Prior Publication Data
US 2011/0289790 A1 Dec. 1, 2011

(30) Foreign Application Priority Data
Aug. 4, 2008 (JP) .................................. 2008-201183

(51) Int. Cl.
*H05B 6/02* (2006.01)
*F26B 3/20* (2006.01)
(Continued)

(52) U.S. Cl.
CPC . *F26B 3/20* (2013.01); *F26B 15/18* (2013.01); *F26B 23/04* (2013.01); *H01M 4/04* (2013.01); *H01M 4/0404* (2013.01); *H01M 4/0435* (2013.01); *Y02E 60/122* (2013.01)

(58) Field of Classification Search
CPC .................................. F26B 3/20; F26B 23/04
USPC ......... 219/600, 645, 647, 650, 653, 666–667;
34/247; 29/623.2, 731; 427/421, 195,
427/318, 346, 398.3, 425; 137/340, 565.17
See application file for complete search history.

(56) References Cited

U.S. PATENT DOCUMENTS 5,403,624 A * 4/1995 DiMaio et al. ................... 427/10
6,054,038 A * 4/2000 Davis ..................... G01N 17/02
204/404

(Continued)

FOREIGN PATENT DOCUMENTS

JP 9-180713 A 7/1997
JP 9-283123 A 10/1997
(Continued)

*Primary Examiner* — Phuong Nguyen
(74) *Attorney, Agent, or Firm* — Young Basile

(57) ABSTRACT

An electrode material drying method and apparatus for drying electrode material are provided for achieving quality improvement of batteries. Electrode material portions containing a solvent are spaced apart from each other on the metal foil. An inductive coil that inductively heats the metal foil faces the metal foil. An amount of heat applied to an uncoated portion of the metal foil between the electrode material portions is reduced below that of a coated portion of the metal foil on which the electrode material portions are arranged. The heat evaporates the solvent in the electrode material portions by causing the metal foil to generate heat with inductive heating while moving the metal foil and the inductive coil relative to each other in an arrangement direction, that is, a direction in which the electrode material portions are arranged.

13 Claims, 21 Drawing Sheets

(51) Int. Cl.
*F26B 15/18* (2006.01)
*F26B 23/04* (2006.01)
*H01M 4/04* (2006.01)

(56) References Cited

U.S. PATENT DOCUMENTS

2003/0015523 A1* 1/2003 Nishinomiya et al. ........ 219/653
2006/0126263 A1* 6/2006 Tsunekawa ............ H01G 9/155
 361/301.1
2009/0100669 A1 4/2009 Ikeda et al.

FOREIGN PATENT DOCUMENTS

| JP | 2004-327203 A | 11/2004 |
| JP | 2004-335374 A | 11/2004 |
| JP | 2004335374 | * 11/2004 |
| JP | 2006-114228 | 4/2006 |
| RU | 2303318 | 7/2007 |

* cited by examiner

METHOD AND APPARATUS FOR DRYING ELECTRODE MATERIAL

CROSS-REFERENCE TO RELATED APPLICATION

This application claims priority from Japanese Patent Application Serial No. 2008-201183, filed Aug. 4, 2008, which is incorporated herein in its entirety by reference.

TECHNICAL FIELD

The present invention relates to a method and an apparatus for drying an electrode material.

BACKGROUND

Recently, a lithium-ion secondary battery has been the focus of research as a secondary battery, which is a key for putting electric and hybrid electric cars into practical use. The lithium-ion secondary battery has a configuration in which flat electrodes are formed on surfaces of respective metal foils serving as a current collector and a multiple of the electrodes and the metal foils are stacked together in order to improve energy density. The electrode is formed by applying an electrode material including an active material, a solvent, or the like on a metal foil, drying the electrode material, pressing the electrode material and so on.

For example, according to a technique described in Japanese Patent Application Laid-Open No. 2004-327203, an electrode material is continuously applied on a surface of a long metal foil while conveying the metal foil, and the electrode material is then dried by inductive heating. In particular, an inductive coil used for inductively heating the metal foil is opposed to the surface of the metal foil, and the metal foil is continuously subjected to inductive heating while moving the metal foil.

BRIEF SUMMARY

Embodiments of the invention, in contrast, are used in techniques where an electrode material is intermittently applied to a surface of a long metal foil to form coated and uncoated portions before drying and pressing. Such embodiments provide a method and an apparatus for drying electrode material in which an excessive increase in temperature of an uncoated portion in a metal foil, on which electrode material portions are intermittently arranged, is suppressed and the metal foil is prevented from being degraded or the like in order to improve the quality of electrode material.

In order to achieve the above-mentioned object, a method for drying electrode material according to the present invention includes firstly providing a metal foil on which electrode material portions are spaced apart by applying the electrode material portions containing a solvent on a metal foil and arranging an inductive coil used for inductively heating the metal foil in opposition to the metal foil. The solvent is evaporated by causing the metal foil to generate heat from inductive heating while relatively moving the metal foil and the inductive coil in an arrangement direction of the electrode material portions. In evaporating the solvent, an amount of heat applied to an uncoated portion in the metal foil, which is exposed between the electrode material portions, is reduced below an amount of heat applied to a coated portion of the metal foil on which the electrode material portions are arranged.

In order to achieve the above-mentioned object, an apparatus for drying electrode material according to the present invention includes an inductive coil arranged in opposition to a metal foil on which electrode material portions containing a solvent are spaced apart from each other. The inductive coil inductively heats the metal foil. A conveyer relatively moves the metal foil and the inductive coil in an arrangement direction of the electrode material portions, and a power supply provides power to the inductive coil. A controller controls the power supply to reduce power provided to the inductive coil in order to reduce an amount of heat applied to an uncoated portion in the metal foil, exposed between the electrode material portions, below that of a coated portion in the metal foil on which the electrode material portions are arranged. The heat evaporates the solvent by causing the metal foil to generate heat from inductive heating while the controller relatively moves the metal foil and the inductive coil in the arrangement direction.

In order to achieve the above-mentioned object, an apparatus for drying electrode material according to the present invention includes an inductive coil arranged in opposition to a metal foil on which electrode material portions containing a solvent are spaced apart. The inductive coil inductively heats the metal foil, and a conveyer relatively moves the metal foil and the inductive coil in an arrangement direction of the electrode material portions. A power supply provides power to the inductive coil, and a controller controls the conveyer. The controller controls the conveyer to increase velocity of the metal foil relative to the inductive coil in order to reduce an amount of heat applied to an uncoated portion in the metal foil, exposed between the electrode material portions, below that of a coated portion in the metal foil on which the electrode material portions are arranged. The heat evaporates the solvent by causing the metal foil to generate from with inductive heating while the controller relatively moves the metal foil and the inductive coil in the arrangement direction.

Details and variations in these and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

An electrode formation process includes not only a continuous coating process in which electrode material portions are continuously arranged as described earlier, but also an intermittent coating process in which electrode material portions are intermittently arranged. In the intermittent coating process, the electrode material portions are spaced apart by applying the electrode material portions on the metal foil. In this specification, a portion of the metal foil, on which the electrode material portion is applied, is referred to as a coated portion, whereas another portion of the metal foil, which is exposed between the electrode material portions, is referred to as an uncoated portion. By intermittently arranging the electrode material portions on the metal foil, coated portions and uncoated portions are formed one after the other on the metal foil. The uncoated portion is used for a tab electrically connecting electrodes with each other or a tab electrically connecting an external terminal of a battery and the metal foil.

Since, in an uncoated portion, a metal foil is exposed without arranging an electrode material, an amount of heat applied to the uncoated portion is less than that of a coated portion. Thus, a temperature of the uncoated portion may be increased to an excessive degree when the metal foil, which is a thin film, is continuously subjected to inductive heating and generates heat. An excessive increase in the temperature of the uncoated portion may cause defects such as abnormal extension of the uncoated portion, degradation due to oxidization, and so on, thereby deteriorating the quality of an electrode and then deteriorating the quality of a battery.

According to the present invention, it is possible to improve the quality of an electrode material by suppressing an excessive increase in temperature of an uncoated portion in a metal foil, on which electrode metal portions are intermittently arranged and preventing the metal foil from being degraded or the like Embodiments of the invention are now described with reference to the drawings. It is noted that repeated explanations are omitted throughout the embodiments.

Figure 1:
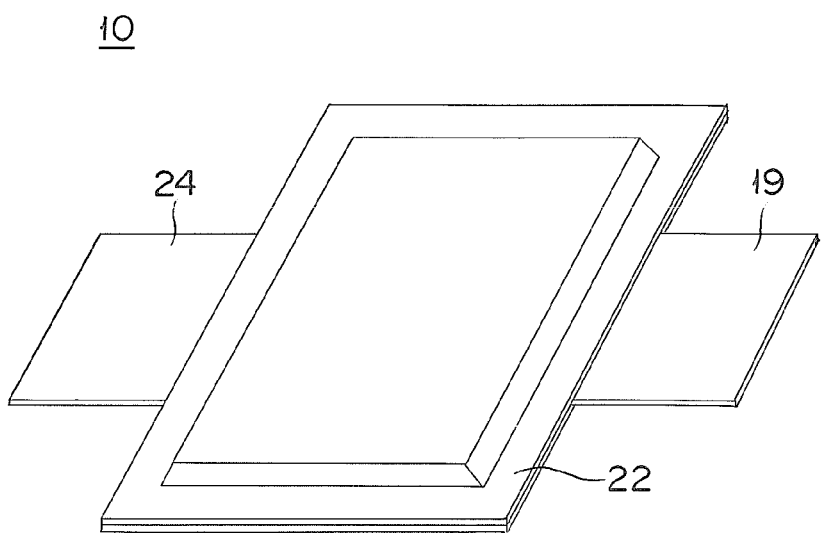
FIG. 1 is a perspective view of a lithium-ion secondary battery.
Figure 2:
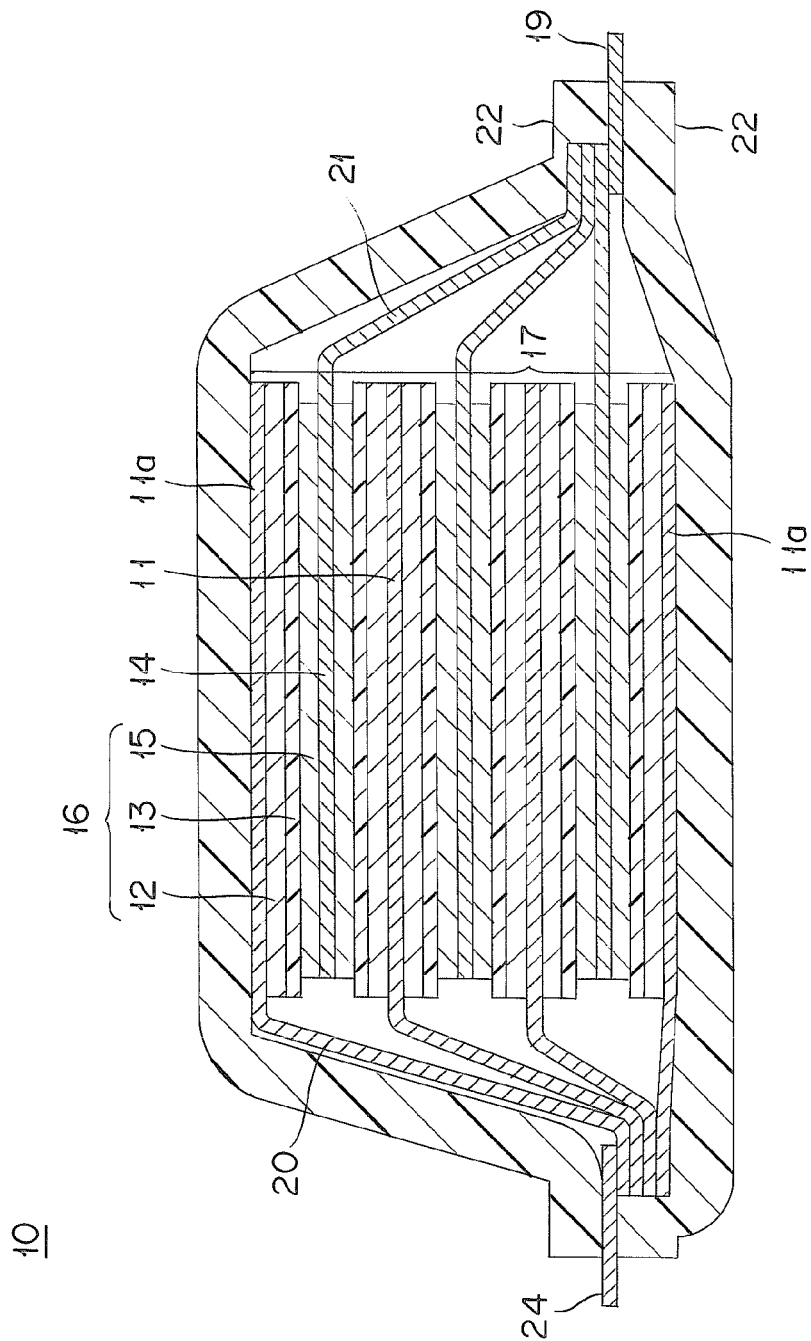
FIG. 2 is a sectional view diagrammatically illustrating a configuration of the lithium-ion secondary battery.

As shown in FIG. 1 and FIG. 2, a lithium-ion secondary battery 10 is configured such that a battery element 17 is accommodated in an exterior casing 22 and external impact and environmental deterioration are prohibited.

The battery element 17 has a configuration such that a plurality of battery cell layers 16, each including a cathode 12, an electrolyte layer 13 and an anode 15, are stacked. The cathode 12 is formed by providing a cathode active material layer on both sides of a cathode collector 11. The anode 15 is formed by providing anode active material layer on both sides of an anode collector 14. In the lithium-ion secondary battery 10 as illustrated in FIGS. 1 and 2, each of the battery cell layers 16 is electrically connected in parallel. A cathode 12 is formed on the outer-facing side of the outermost external cathode collectors 11a located adjacent to the outermost external layers of the battery element 17.

In order to draw current from the battery element 17, a cathode tab 24 and an anode tab 19, which serve as external terminals, extend outwardly from the exterior casing 22. The cathode tab 24 is connected to each of cathode collectors 11 through respective cathode leads 20. The anode tab 19 is connected to each of anode collectors 14 through respective anode leads 21.

In terms of light weight and thermal conductivity, the exterior casing 22 is made of a sheet member such as a polymer-metal composite laminate film, which is formed by coating a metal such as aluminum, stainless steel, nickel and/or copper (including an alloy thereof) with an insulator such as a polypropylene film and so on. The exterior casing 22 seals the battery element 17 by joining all or some of peripherals of the sheet member using thermal fusion.

An apparatus for coating and drying an electrode material according to a first embodiment is described with reference to FIGS. 3-11.

Figure 3:
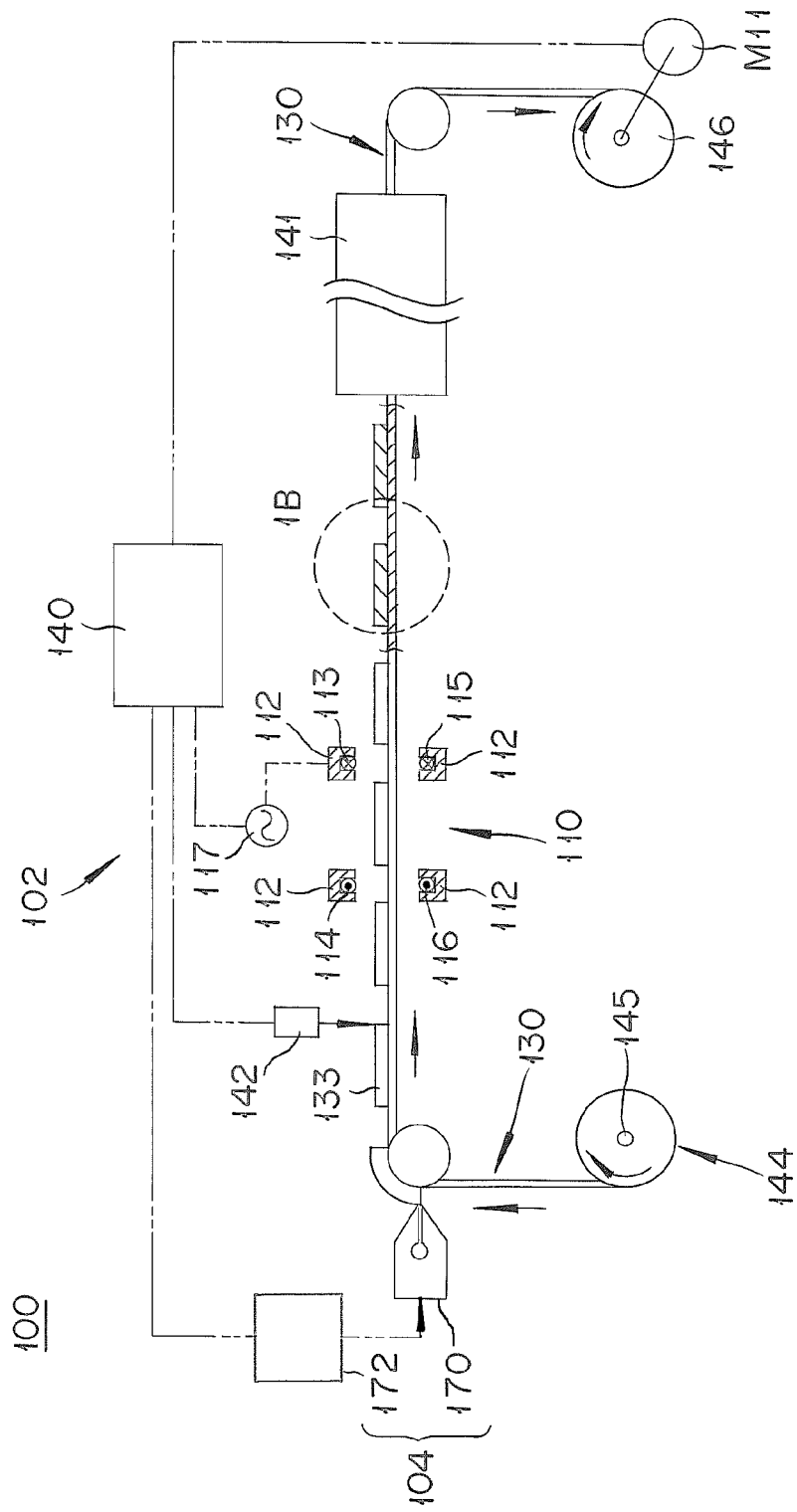
FIG. 3 is a schematic diagram of an apparatus for coating and drying an electrode material according to a first embodiment.
Figure 4:
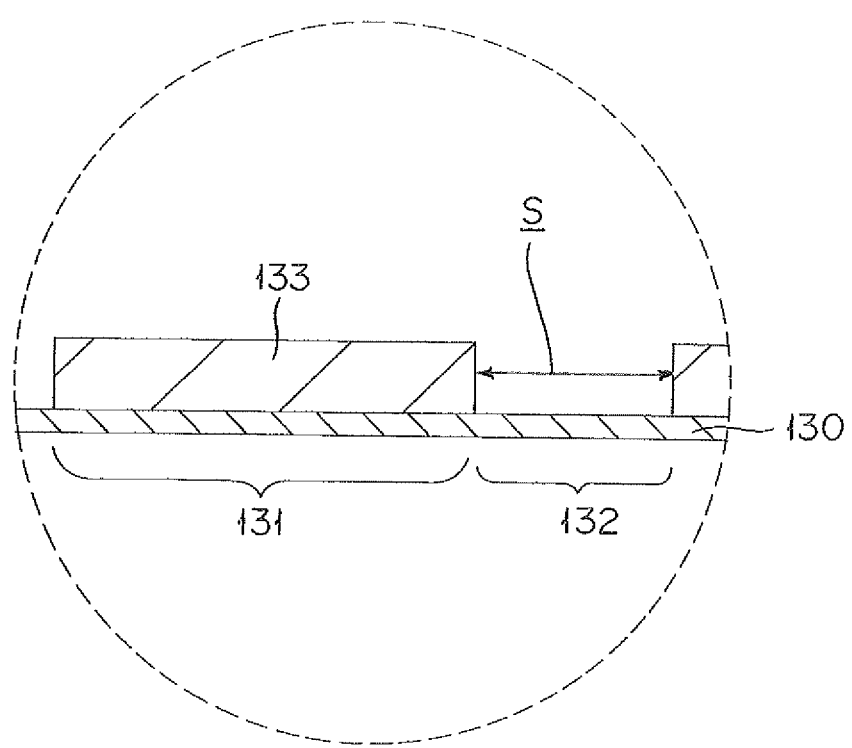
FIG. 4 is a partial enlarged view of FIG. 3.

As shown in FIGS. 3 and 4, a coating and drying apparatus 100 is an apparatus that is used for fabricating electrodes (i.e., a cathode 12 and an anode 15) of the lithium-ion secondary battery 10 by applying a slurry of an electrode material 133 on a metal foil 130 serving as a current collector and drying the electrode material 133 by evaporating a solvent contained in the electrode material 133. The coating and drying apparatus 100 has an electrode material drying apparatus 102 for drying the electrode material 133 by evaporating a solvent in the electrode material 133 and a coating machine 104 for applying the electrode material 133 on the metal foil 130.

The coating machine 104 has a slit die 170 feeding the electrode material 133 and an electrode material supplying portion 172 for supplying the electrode material 133 to the slit die 170. The electrode material supplying portion 172 has a tank (not shown) for accommodating the electrode material 133 and a pump (not shown) for pressurizing the electrode material 133. The slit die 170 has a linear slit and intermittently applies the electrode material 133 from the slit in the arrangement direction in which the metal foil 130 is conveyed. The electrode material portions 133 are arranged in the arrangement direction in which the metal foil 130 is conveyed such that the electrode material portions 133 are spaced apart by a distance S (see FIG. 4).

The electrode material drying apparatus 102 has, in general, an inductive coil 110 arranged in opposition to the tape-shaped metal foil 130 on which electrode material portions 133 containing a solvent are intermittently arranged to inductively heat the metal foil 130. The electrode material drying apparatus 102 also includes a conveyer for relatively moving the metal foil 130 and the inductive coil 110 in an arrangement direction in which the electrode material portions 133 are arranged, a high frequency power supply 117 for supplying power to the inductive coil 110 and a controller, or controlling unit, 140 for not only controlling the high frequency power supply 117 but also controlling operations of the coating and drying apparatus 100 as a whole.

The controller 140 relatively moves the metal foil 130 and the inductive coil 110 in the arrangement direction of the electrode material portions 133. Concurrently, in evaporating a solvent by causing the metal foil 130 to generate heat with inductive heating, the controller 140 reduces an amount of heat applied to an uncoated portion 132 in the metal foil 130 exposed between the coated portions 131 of the metal foil 130 that support electrode material portions 133 by controlling the high frequency power supply 117 to reduce power supplied to the inductive coil 110. The controller 140 stepwise or continuously changes the amount of heat applied to the metal foil 130.

An illustrated example of an electrode material drying apparatus 102 has a hot air dryer 141 in addition to the inductive coil 110 for inductively heating the metal foil 130 in order to evaporate a solvent in the electrode material 133. The hot air dryer 141 is preliminarily provided for reliably drying the electrode material 133. Furthermore, the electrode material drying apparatus 102 has a sensor 142 for detecting the arrangement of the electrode material portions 133, as will be described in detail in the following.

Since one lithium-ion secondary battery 10 uses numerous electrodes, the electrodes are, in general, continuously produced by applying electrode material portions 133 on a long metal foil 130 in order to mass-produce the electrodes. In continuously producing the electrodes, roll-to-roll processing is suitable for an electrode stacking (storage) method.

To do this, in the first embodiment, the conveyer conveys the long metal foil 130 using roll-to-roll processing. The conveyer has a supply roll 144 for supplying the metal foil 130 as a current collector, a take-up roll 146 for taking up the metal foil 130 and a plurality of support rolls (not shown) for supporting a lower surface of the metal foil 130. A motor M11 connected to an axis of the take-up roll 146 rotates the take-up roll 146. The supply roll 144 with wound metal foil 130 is provided with a brake mechanism, which is not shown, at an axis 145 and feeds the metal foil 130 with an applied tension. The take-up roll 146 takes up the metal foil 130 from the supply roll 144 and conveys the metal foil 130.

The metal foil 130 may be made of appropriate materials such as aluminum, copper, nickel, iron and/or stainless steel. In particular, for example, a cathode collector may be made of a metal foil 130 such as aluminum and an anode collector may be made of a metal foil 130 such as copper. Though a specific thickness of the metal foil 130 is not particularly limited, the metal foil 130 is a thin film having about 20 μm thickness for aluminum and about 10 μm thickness for copper.

Electrode materials 133 include a cathode electrode material used for forming a cathode and an anode electrode material used for forming an anode of the lithium-ion secondary battery 10.

On one hand, the cathode electrode material contains, for example, a cathode active material, a conductive additive and a binder, and these components are uniformly dispersed by adding a solvent, thereby being prepared to a predetermined viscosity. The cathode active material may be, for example, lithium manganate. The conductive additive may be, for example, acetylene black. The binder may be, for example, PVDF (Polyvinylidene Fluoride). The solvent may be, for example, NMP (N-Methylpyrrolidone).

The cathode active material is not limited to lithium manganate, but lithium transition metal composite oxide is preferably used as the cathode active material from the viewpoint of capacity and output. Carbon black or graphite may be, for example, used as the conductive additive. The binder is not limited to PVDF. In addition, the solvent is not limited to NMP, but any known solvents may be used as the solvent.

On the other hand, the anode electrode material contains, for example, an anode active material, a conductive additive and a binder, and these components are uniformly dispersed by adding a solvent, thereby being prepared to a predetermined viscosity. The anode active material may be, for example, graphite. The conductive additive, the binder, and the solvent may be, for example, acetylene black, PVDF, and NMP, respectively.

The anode active material is not particularly limited to graphite, but hard carbon or lithium transition metal composite oxide may be used as the anode active material. Carbon black or graphite may be, for example, used as the conductive additive. The binder is not limited to PVDF. In addition, the solvent is not limited to NMP, but any known solvents may be used as the solvent.

The sensor 142 detects an edge of the electrode material portion 133 corresponding to a border between the coated portion 131 and the uncoated portion 132, and converts arrangement information of the electrode material portions 133 to a signal. Taking into account a variation in length of the metal foil 130 due to tension, the sensor 142 is located immediately in front of the inductive coil 110 upstream in the arrangement direction in which the metal foil 130 is conveyed. It is noted that the sensor 142 may be conveniently achieved by a reflective optoelectronic sensor, a laser range sensor, or the like.

Alternatively, in place of the sensor 142, the arrangement information of the coated portion 131 and the uncoated portion 132 may be detected from an amount taken up by the take-up roll, wherein the amount can be measured by an encoder (not shown) provided in the motor M11. It is noted that detection accuracy according to this embodiment can be rather high because a position of the coated portion 131 and a position of the uncoated portion 132 are directly detected using the sensor 142 as described above.

The controller 140 and other controller described herein consist mainly of a CPU and a memory storing a software program for controlling operations as described herein. The sensor 142 is electrically connected to the controller 140, and a signal from the sensor 142 enters the controller 140. The controller 140 controls an output of the high frequency power supply 117 based on the signal from the sensor 142. The high frequency power supply 117 is electrically connected to the inductive coil 110 and generates lines of magnetic force by applying AC power. The controller 140 can stepwise or continuously change the amount of heat applied to the metal foil 130 by controlling the high frequency power supply 117.

In addition, the controller 140 controls activation of the coating machine 104 and adjusts an application amount and an application thickness of the electrode material 133, a width of the electrode material 133 in the arrangement direction in which the electrode material 133 is conveyed, a distance between the electrode material portions 133, and so on. The controller 140 further controls activation of the motor M11 and adjusts conveying velocity of the metal foil 130. For example, the controller 140 controls the motor M11 so that the conveying velocity of the metal foil 130 is fixed at a rate of 1 m/min. Other embodiments convey the foil 130 at other speeds, including varying speeds.

The hot air dryer 141 is located downstream in the arrangement direction (that is, in the conveying direction of the metal foil 130) in relation to the inductive coil 110 and removes a solvent from the electrode material 133 while the metal foil 130 goes through the dryer. The hot air dryer 141 may be achieved using a technique known in the art and applies heat to the electrode material 133 with hot air in order to evaporate the solvent in the electrode material 133.

Figure 5A:
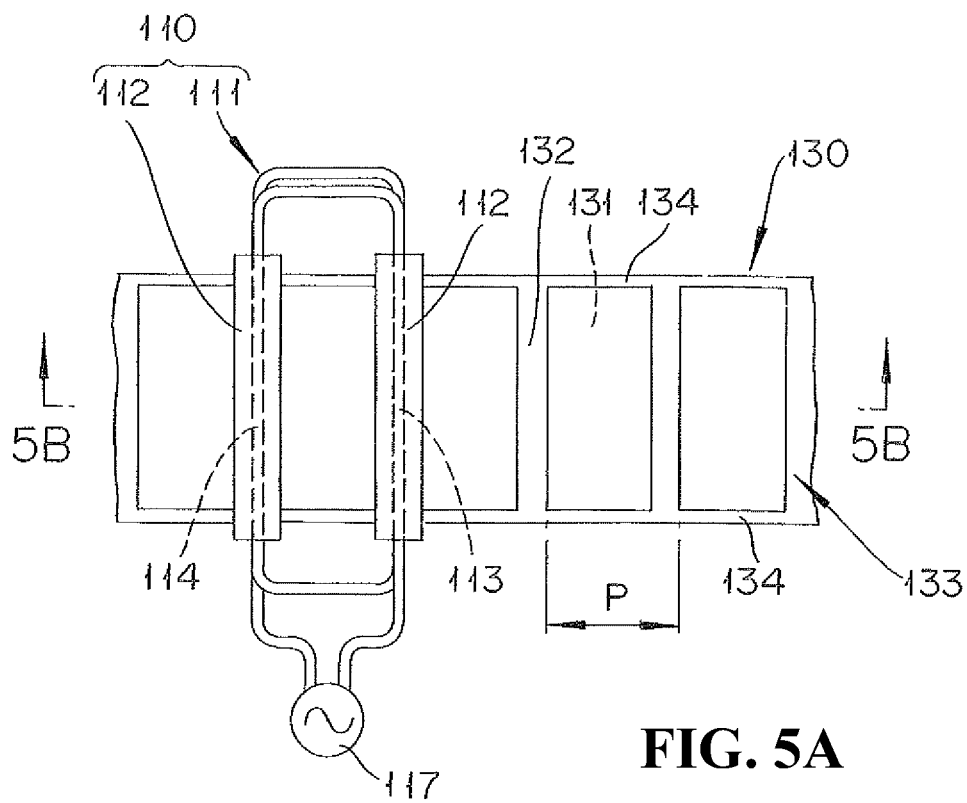
FIG. 5A is a top view illustrating main parts of an apparatus for drying an electrode material.
Figure 5B:
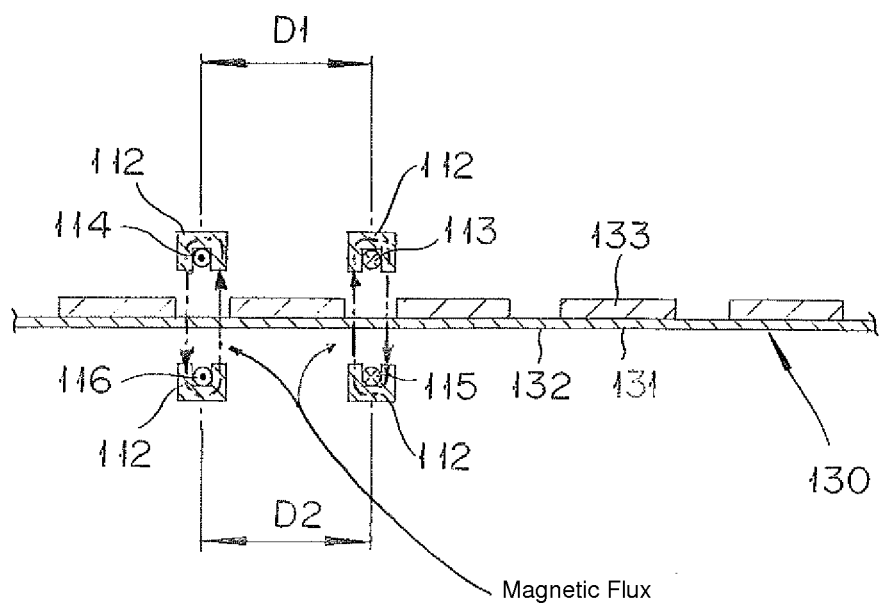
FIG. 5B is a sectional view taken along line 5B-5B in FIG. 5A.

As can be seen in FIGS. 5A and 5B, the inductive coil 110 is arranged such that a magnetic flux produced by the inductive coil 110 is transmitted through a surface of the metal foil 130 in a direction perpendicular to the surface. This is because a thin metal foil 130 can generate heat when the thin metal foil 130 is adequately subjected to inductive heating. That is to say, in an example in which a magnetic flux is produced in a direction parallel to the surface of the metal foil by winding the inductive coil around the metal foil, eddy current flows around a periphery of a section of the metal foil. As a result, as a thickness of the metal foil becomes thinner, the metal foil generates less Joule heat because eddy currents that flow in opposite directions in the section of the metal foil cancel each other out or interfere with each other. In contrast, if a magnetic field is produced in a direction perpendicular to the metal foil 130, eddy current flows in a direction parallel to the surface of the metal foil 130 and the thin metal foil 130 can generate sufficient Joule heat. It is noted that, although less desirable in some circumstances, the present invention does not exclude an aspect in which a magnetic flux is produced in a direction parallel to the surface of the metal foil by winding the inductive coil around the metal foil. This is because the metal foil may generate sufficient Joule heat depending on a dimension of thickness of used metal foil.

The inductive coil 110 includes an inductive heating portion that extends transversely to the arrangement direction of the electrode material portions 133, and the controller 140 reduces an amount of heat applied to the metal foil 130 when the inductive heating portion is aligned with the uncoated portion 132 to below that applied to the metal foil 130 when the inductive heating portion is aligned with the coated portion 131. Thus, it is possible to reduce the amount of heat applied to the uncoated portion 132 to less than that applied to the coated portion 131. It is sufficient to provide at least one inductive heating portion such that the inductive heating portion is opposed to one surface of the metal foil 130 in order to inductively heat the metal foil 130.

It is noted that, in order to cause the metal foil 130 to effectively generate heat, inductive heating portions may be provided such that the inductive heating portions are opposed to either side of the metal foils 130 or several inductive heating portions are opposed to one side of the metal foil 130.

Accordingly, in the first embodiment, the inductive coil 110 is arranged from the viewpoint of causing the metal foil 130 to effectively generate heat as follows.

As can be seen in FIGS. 5A and 5B, the inductive coil 110 includes at least two, first and second, inductive heating portions extending transversely to the arrangement direction of the electrode material portions 133 and spaced apart in the arrangement direction. A distance between the first and the second inductive heating portions has a dimension such that the first and the second inductive heating portions are aligned with respective different uncoated portions 132 concurrently. The controller 140 then reduces an amount of heat applied to the metal foil 130 when the first and second inductive heating portions are aligned with respective uncoated portions 132 below that applied to the metal foil 130 when the inductive heating portions are aligned with the coated portions 131.

In particular, as can be seen in FIG. 5A, the inductive coil 110 is opposed to a surface of the metal foil 130 and produces a magnetic field in a direction perpendicular to the surface of the metal foil 130. The inductive coil 110 has a coil body 111 through which AC current flows and a long magnetic core 112 made of ferrite. The coil body 111 may be, for example, a copper pipe.

The electrode material portions 133 are intermittently arranged along a longitudinal direction of the metal foil 130 and generally at the center of a transverse direction (a width direction from top to bottom in FIG. 5A) of a surface of the metal foil 130. In other words, the metal foil 130 includes an exposed portion 134 on which the electrode material portion 133 is not arranged in at least one end in the transverse direction of the metal foil 130, wherein the transverse direction crosses the arrangement direction of the electrode material portions 133. In this manner, provision of the exposed portion 134 prevents the electrode material 133 applied on one surface of the metal foil 130 from dropping down to an opposite surface.

As can be seen in FIG. 5B, a section of the magnetic core 112 is generally U-shaped. The magnetic core 112 surrounds each of inductive heating portions 113, 114, 115 and 116 of the inductive coil 110. The magnetic core 112 provides a magnetic path that transmits a magnetic flux generated by the inductive coil 110 perpendicular to a surface of the metal foil 130. The inductive coil 110 is operable to focus lines of magnetic force on the metal foil 130 by the magnetic core 112 so as to effectively heat the metal foil 130.

The inductive heating portion 113 and the inductive heating portion 114 are spaced apart from each other on one side of metal foil 130 by the same distance (P multiplied by 1) as a pitch P (D1=P) by which the electrode material portions 133 are arranged. The inductive heating portions 113 and 114 are concurrently aligned with respective different uncoated portions 132.

The inductive heating portion 115 and the inductive heating portion 116 are arranged on the opposite side of the metal foil 130 from the portions 113, 114. The inductive heating portions 115 and 116 spaced apart from each other by the same distance (P multiplied by 1) as the pitch P (D2=P), and the inductive heating portions 115 and 116 are concurrently aligned with respective different uncoated portions 132.

In FIG. 5B, the inductive heating portions 113 and 114 located at an upper side of the metal foil 130 constitute the first and second inductive heating portions, and the inductive heating portions 115 and 116 located at a lower side of the metal foil 130 also constitute the first and second inductive heating portions. The first inductive heating portion and the second inductive heating portion are spaced apart from each other by a pitch by which the electrode material portions 133 are arranged multiplied by a natural number so that the first and second inductive heating portions are concurrently aligned with respective different uncoated portions 132. In the first embodiment, for ease of understanding, the distance between the first and second inductive heating portions is set to be equal to the pitch by which the electrode material portions 133 are arranged. In this context, use of the term "concurrently" is intended to clarify the difference between this embodiment and a fifth embodiment, described below, in which an amount of heat applied to a part of a coated portion is positively reduced, and another inductive coil is arranged to compensate for the reduced amount of heat applied to the part of the coated portion. Therefore, a variation of the first embodiment is possible in which, at a certain instant, even if either one of the first and second inductive heating portions is not aligned with the uncoated portion 132, it is not necessary to compensate for the amount of heat applied to the coated portion 131 by another inductive coil. In the case where the amount of heat applied to the coated portion 131 does not need to be compensated for by another inductive coil, as described above, a distance between the first and second inductive heating portions can be exemplified by, for example, a size calculated by adding a distance S along a conveying direction of the metal foil 130 to the pitch, a size calculated by subtracting the distance S from the pitch, or the like. In addition, the distance between the first and second inductive heating portions may be, for example, a size calculated by adding/subtracting a diameter of a coil body, in particular, a diameter of a copper pipe forming the coil body in the above-mentioned example, to/from the pitch.

Figure 6:
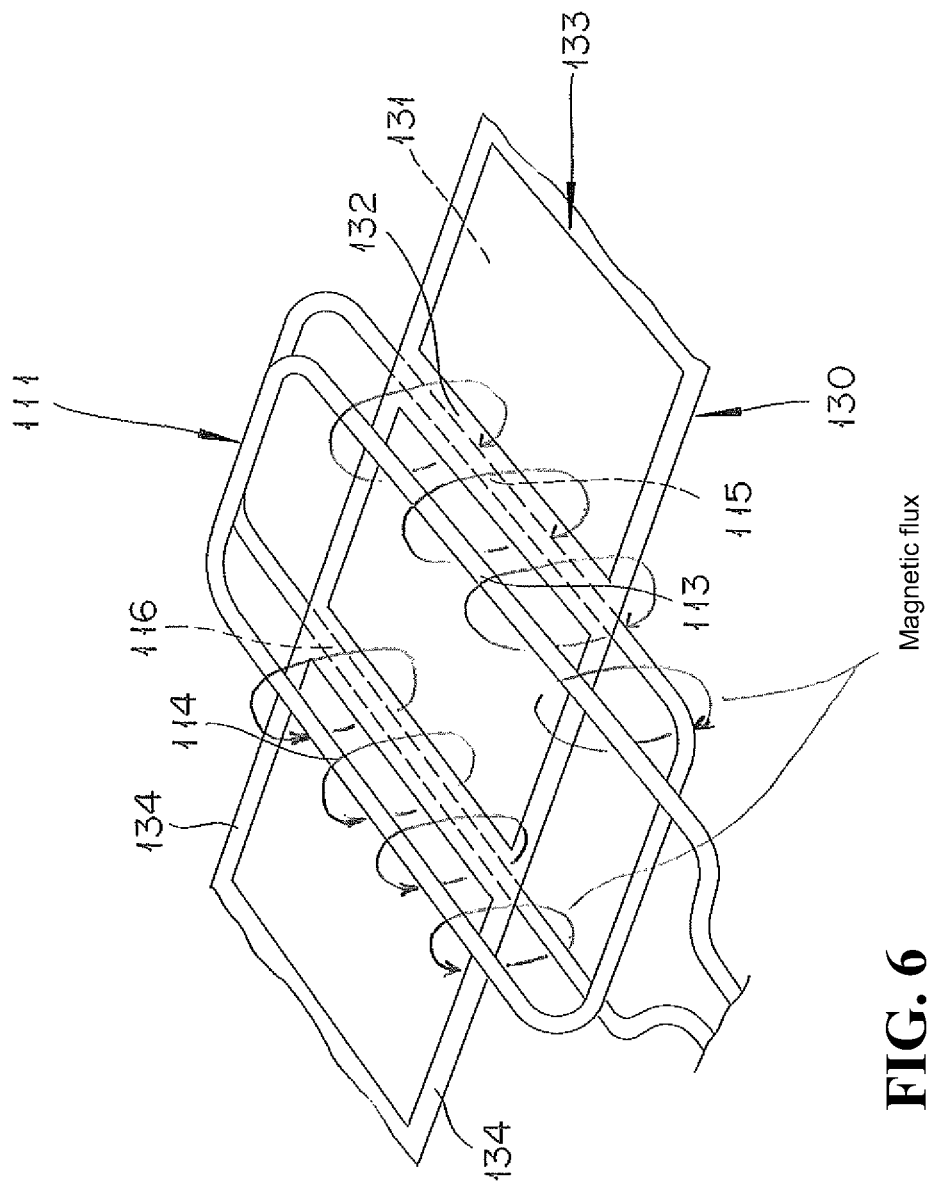
FIG. 6 is a perspective view illustrating an inductive coil.

As shown in FIG. 6, the coil body 111 is formed, for example, by folding a copper pipe. Each of the inductive heating portions 113, 114, 115 and 116 is formed in a linear shape. The inductive heating portions 113 and 114 are in parallel with each other and the inductive heating portions 115 and 116 are in parallel with each other.

Furthermore, the inductive heating portions 113 and 115 are formed such that they are opposed to each other with the metal foil 130 interleaved therebetween. The inductive heating portions 114 and 116 are formed such that they are opposed to each other with the metal foil 130 interleaved therebetween. In this case, the coil body 111 is folded such that directions of AC currents flowing through the inductive heating portion 113 and 115 are identical, and directions of AC currents flowing through the inductive heating portions 114 and 116 are identical.

In this manner, the inductive coil 110 includes pairs of inductive heating portions 113 and 115 and inductive heating portions 114 and 116 that are opposed to each other with the metal foil 130 interleaved therebetween. The high frequency power supply 117 causes the same direction current to flow in respective pairs of the inductive heating portions 113 and 115 and the inductive heating portions 114 and 116. Consequently, one induced current in the metal foil 130 generated by lines of magnetic force caused by the inductive heating portion 113 and the other induced current in the metal foil 130 generated by lines of magnetic force caused by the inductive heating portion 115 flow in the same direction without cancelling out each other. Therefore, the metal foil 130 generates enough Joule heat. This is the case with the inductive heating portions 114 and 116 as well.

The direction in which the inductive heating portions 113, 115, 114 and 116 of the inductive coil 110 extend is preferably perpendicular to the arrangement direction of the electrode material portions 133. During movement of the metal foil 130, the inductive coil 110 will concurrently overlap on edges of the electrode material portions 133 and will concurrently leave the edges of the electrode material portions 133 viewed from a transverse direction of the metal foil 130. This is why the electrode material portions 133 can be uniformly heated in the transverse direction of the metal foil 130 in the case where an amount of heat applied to the metal foil 130 is controlled to be decreased or increased.

An interior of the coil body 111 is in communication with a chiller (not shown) for feeding cooling water. During inductive heating, the cooling water supplied from the chiller is circulated through the interior of the coil body 111 to inhibit an increase in temperature of the coil body 111.

A method for drying an electrode material 133 will now be described.

In general, a sequence of drying an electrode material 133 consists in firstly providing a tape-shaped metal foil 130 on which electrode material portions 133 containing a solvent are intermittently spaced apart from each other by a distance S. An inductive coil 110 is then provided in a position opposed to the metal foil 130. The metal foil 130 then generates heat due to inductive heating in order to evaporate the solvent while the metal foil 130 is moved relative to the inductive coil 110 by rotating a take-up roll 146. At the same time, an amount of heat applied to an uncoated portion 132 of the metal foil 130 is reduced below an amount of heat applied to a coated portion 131 of the metal foil 130. In the first embodiment, the metal foil 130 is moved relative to the inductive coil 110 by conveying the metal foil 130. In addition, a controller 140 controls a high frequency power supply 117 and reduces the amount of heat applied to the uncoated portion 132 below the amount of heat applied to the coated portion 131 by reducing power supplied to the inductive coil 110. More details will now be explained.

In the first embodiment, while the metal foil 130 is conveyed relative to the inductive coil 110 in the arrangement direction of the electrode material portions 133, inductive heating causes the metal foil 130 to generate heat in order to evaporate a solvent in the electrode material portions 133. On this occasion, first and second inductive heating portions are concurrently aligned with respective different uncoated portions, and if the first and second inductive heating portions are aligned with the respective uncoated portions, an amount of heat applied to the metal foil is reduced below the amount of heat applied when the first and second inductive heating portions are aligned with respective coated portions.

In other words, inductive heating portions 113 and 114 and inductive heating portions 115 and 116 are concurrently aligned with respective different uncoated portions 132, and if the inductive heating portions 113, 114, 115 and 116 are aligned with the uncoated portions 132, an amount of heat applied to the metal foil 130 is reduced in comparison with the situations where the inductive heating portions 113, 114, 115 and 116 are aligned with coated portions 131.

Figure 7:
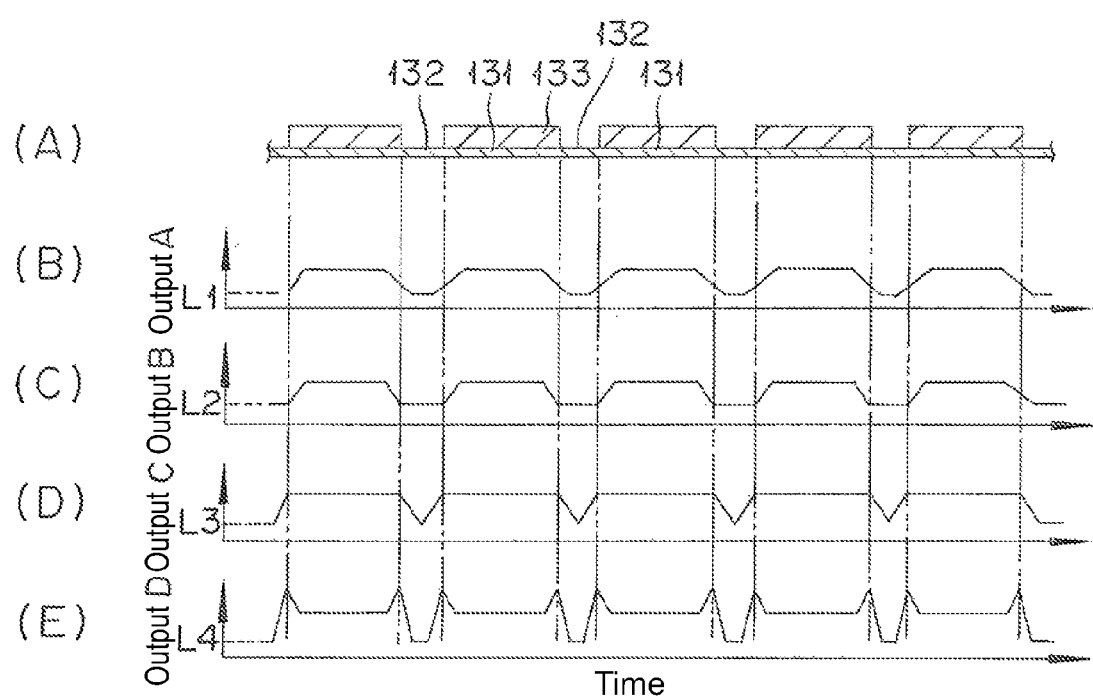
FIG. 7 includes in (A) a sectional view showing a metal foil on which electrode material portions are intermittently arranged and in (B) to (E) graphs illustrating relations between a variation in an output of a high frequency power supply and an array pattern of the electrode material portions, respectively.
Figure 8:
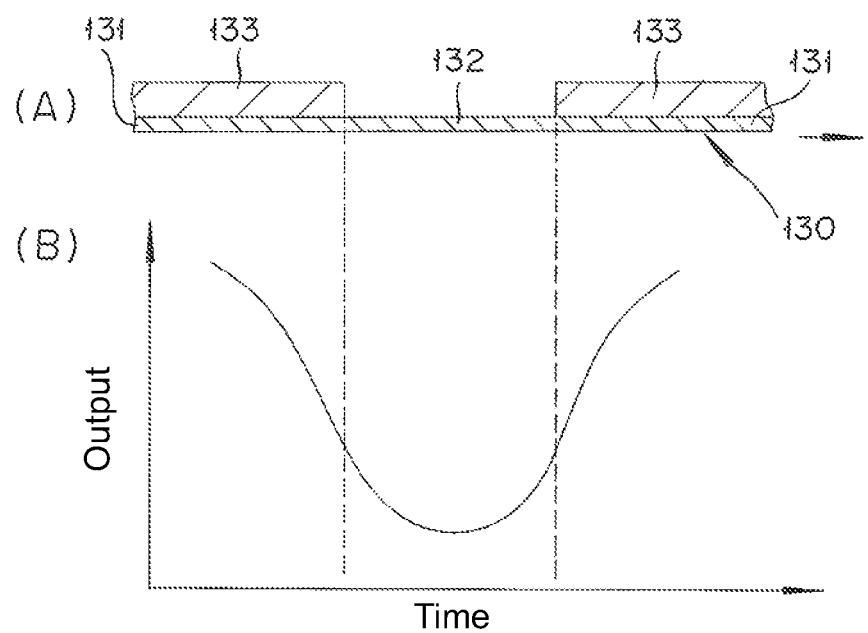
FIG. 8 includes in (A) a sectional view showing a metal foil on which electrode material portions are intermittently arranged and in (B) a graph illustrating a relation between a variation in an output of a high frequency power supply and an array pattern of the electrode material portions.

In particular, as shown in FIG. 7, when the inductive heating portions 113, 114, 115 and 116 are aligned with the uncoated portions 132, power supplied to the inductive coil 130, that is to say, an output of the high frequency power supply 117 is reduced in comparison with the case that the inductive heating portions 113, 114, 115 and 116 are aligned with the coated portions 131. A pattern of the variation in the output of the high frequency power supply 117 may be variously set whenever the output is thus reduced. In FIG. 7, examples are shown in which an amount of heat applied to the metal foil 130, i.e., an output, is stepwisely changed. FIG. 8 illustrates an example in which an amount of heat applied to the metal foil 130, i.e., an output, is continuously changed. An amount of heat applied to an uncoated portion 132 can be reduced below an amount of heat applied to a coated portion 131 regardless whether the amount of heat applied to the metal foil 130 is changed stepwisely or continuously.

Referring to graph (B) of FIG. 7, an example output A is kept constant while the inductive heating portions 113, 114, 115 and 116 are aligned with parts of the coated portions 131. Thereafter, the output starts to be reduced immediately before the inductive heating portions 113, 114, 115 and 116 are aligned with the uncoated portions 132. The output is kept at a lower limit L1 while the inductive heating portions 113, 114, 115 and 116 are aligned with parts of the uncoated portions 132.

Referring to graph (C) of FIG. 7, as is the case with the output A, an example output B starts to be reduced immediately before the inductive heating portions 113, 114, 115 and 116 are aligned with the uncoated portions 132, and the output is kept at a lower limit L2 while the inductive heating portions 113, 114, 115 and 116 are aligned with the uncoated portions 132.

Referring to graph (D) of FIG. 7, an example output C is kept constant while the inductive heating portions 113, 114, 115 and 116 are aligned with the coated portions 131, and the output starts to be reduced at the same time when the inductive heating portions 113, 114, 115 and 116 start to be aligned with the uncoated portions 132. Thereafter, a variation in the output is changed from decrease to increase as the output reaches a lower limit L3.

Referring to graph (E) of FIG. 7, an example output D is kept constant while the inductive heating portions 113, 114, 115 and 116 are aligned with parts of the coated portions 131, and the output starts to be raised immediately before the inductive heating portions 113, 114, 115 and 116 are aligned with the uncoated portions 132. A variation in the output is changed from increase to decrease as the inductive heating portions 113, 114, 115 and 116 are starting to be aligned with the uncoated portions 132, and the output is kept at a lower limit L4 while the inductive heating portions 113, 114, 115 and 116 are aligned with parts of the uncoated portions 132. Thereafter, the output starts to be raised immediately before the inductive heating portions 113, 114, 115 and 116 are starting to be aligned with the coated portions 131. The variation in the output is changed from increase to decrease when the inductive heating portions 113, 114, 115 and 116 start to be aligned with the coated portions 131, and the output is kept constant for a certain period. The example of the output D shown is characterized in that a peak of the output is arranged to correspond to an edge of the coated portion 131, which is likely to be at a lower temperature than that of a center of the coated portion 131, as the output at the uncoated portion 132 decreases.

The lower limits L1, L2, L3 and L4 of the output corresponding to respective patterns and intervals may be variously set. In other words, various lower limits and intervals may be applied as long as they inhibit abnormal extension due to an excessive temperature rise on the uncoated portion 132, an oxide film from being generated on a surface of the uncoated portion or the like, ensure conductivity as a tab and avoid performance degradation.

Though the lower limits L1 to L4 may be equal to zero, it is preferable that a certain degree of heating is applied because a distortion may be provided in the metal foil 130 as a difference between temperatures of the uncoated portion 132 and the coated portion 131 becomes large. For example, heating is applied such that a temperature of the uncoated portion 132 is equal to about 50% that applied to the coated portion 131. In addition, the output may be changed variously. For example, the output may be suddenly decreased to a lower limit or increased from the lower limit in a rectangular way, but preferably the output is changed over a longer period in terms of product quality.

In each of the patterns described above, although the output is kept constant while the inductive heating portions 113, 114, 115 and 116 are aligned with at least parts of the coated portions 131, the output is not limited thereto. Instead, the output may be such that a solvent concentration in the electrode material 133 is equal to or smaller than a desired value, and a temperature of the electrode material 133 is in a range of about 100 to 130° C., for example. In the first embodiment, since the metal foil 130 is inductively heated in order to preheat a hot air dryer 141, a desired value of the solvent concentration in this case is 100 ppm, for example.

In FIG. 7, control of the output is such that the output is kept at the lower limits L1 to L4 while the inductive heating portions 113, 114, 115 and 116 are aligned with the uncoated portions 132, but control is not limited to this way and may be applied in any manner as long as quality degradation of the uncoated portion 132 is inhibited. For example, as can be seen in graph (B) of FIG. 8, control of the output may be such that the output is not kept at the lower limit, but continuously changes.

As described earlier in this specification, the controller 140 changes the output of the high frequency power supply 117 in accordance with an interval in which the inductive heating portions 113, 114, 115 and 116 are aligned with respective coated portions 131 and uncoated portions 132 and evaporates the solvent in the electrode material 133 while suppressing an excessive temperature rise in the uncoated portions 132.

Temperatures of the coated portions 131 and the electrode material 133 are raised twice, when the first pair of the inductive heating portions 114 and 116 is aligned with the coated portions 131, and when the second pair of the inductive heating portions 113 and 115 is aligned with the coated portions 131. These temperatures are then reduced gradually by natural heat release while conveying the metal foil 130.

After evaporating the solvent in the electrode material 133 using the inductive coil 110, the metal foil 130 and the electrode material 133 are conveyed to the hot air dryer 141, and a resultant solvent in the electrode material 133 is removed. Since the hot air dryer 141 may preliminarily dry the electrode material 133, the electrode material 133 may be dried using only the inductive coil 110. After drying the electrode material 133, the electrode material 133 is subjected to pressing so a surface of the electrode material is made smooth.

Figure 9A:
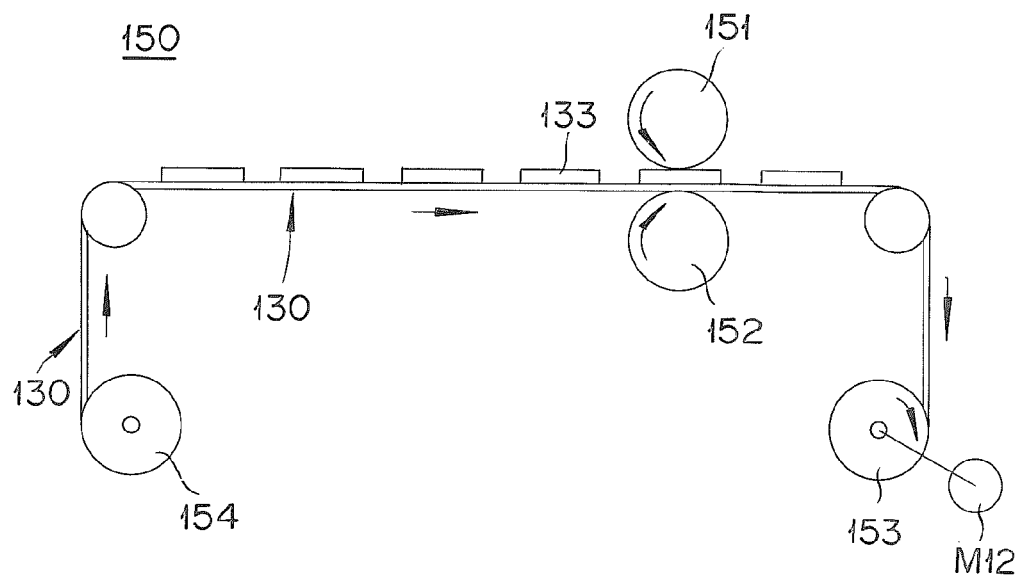
FIG. 9A is a schematic diagram of a press machine for pressing the electrode material portions after drying the electrode material portions.

As shown in FIG. 9A, a press machine 150 presses the electrode material 133 by means of a pair of roll presses 151 and 152 arranged on either side of the metal foil 130 while conveying the metal foil 130.

The press machine 150 has a roll 153 for taking up the metal foil 130 and a motor M12 connected to a rotation axis of the roll 153. The motor M12 rotates the roll 153, which takes up the metal foil 130 from a roll 154 around which the metal foil 130 and the electrode material 133 is wound, and conveys the metal foil 130 and the electrode material 133.

Figure 9B:
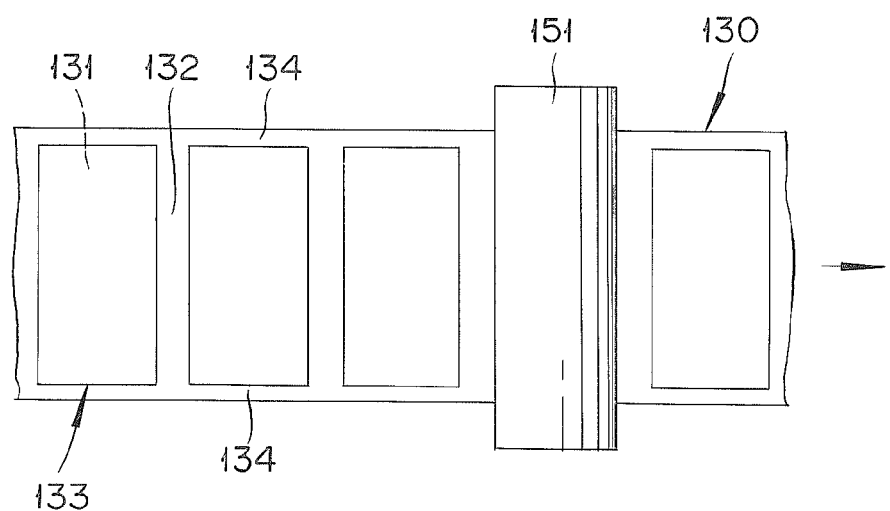
FIG. 9B is a top view illustrating main parts of the press machine of FIG. 9A.

As shown in FIG. 9B, roll presses 151 and 152 alternately press the electrode material portions 133 and the uncoated portions 132 in a direction opposite to that in which the metal foil 130 is conveyed. After being pressed, the uncoated portions 132 are subjected to a force at an exposed portion 134 adjacent to the uncoated portion 132. The force is almost equal to that applied by the roll presses 151 and 152.

To the contrary, since the coated portions 131 in the metal foil 130 have the electrode material portions 133 projected from a surface of the metal foil 130, the coated portions 131 are susceptible to a force larger than that applied to the exposed portion 134 adjacent to the coated portion 131. As a result, there is a difference between extension of the coated portions 131 and that of the exposed portion 134 in a conveying direction.

In particular, in a continuous coating process in which the electrode material portions 133 are not intermittently arranged but are continuously arranged with no space, a difference between an extension of the coated portions 131 and that of the exposed portion 134 is cumulated in the conveying direction so that a distortion may occur in the metal foil 130. The distortion may be significant in the cases where the electrode material portions 133 are applied on the metal foil in a range of 200 μm to 300 μm or more in order to increase electric capacity.

However, according to the inventive embodiment, since the electrode material portions 133 are intermittently arranged, the difference between the extension of the coated portions 131 and the exposed portion 134 after being pressed is not cumulated in the conveying direction of the metal foil 130 as is the case with the continuous coating process, and the distortion of the metal foil 130 due to pressing can be inhibited. Furthermore, if there is some difference in tension between boundary regions of the coated portion 131 and uncoated portion 132, the difference is not cumulated since the regions are remarkably small. Tension is further applied in the conveying direction of the metal foil 130, so the metal foil would not be broken down at a region forming a tab as described above. To do this, it is required that the coated portions 131 are intermittently formed.

It is noted that, in this embodiment, the electrode material 133 is applied on one surface of the metal foil 130, and both surfaces of the metal foil 130 are subjected to drying and pressing. Alternatively, the electrode material 133 may be applied on both sides of the metal foil 130. After drying both sides of the metal foil 130, both sides of the metal foil 130 may be subjected to pressing. In other words, the electrode material 133 can be arranged on one side or both sides of the metal foil 130 by coating, drying and pressing processes.

Effects of the first embodiment will now be described.

In the first embodiment, when inductive heating portions 113, 114, 115 and 116 are aligned with uncoated portions 132, a controller 140 reduces an output of a high frequency power supply 117 in order to reduce a amount of heat applied to a metal foil 130 in comparison with the case when the inductive heating portions are aligned with coated portions 131.

Figure 10:
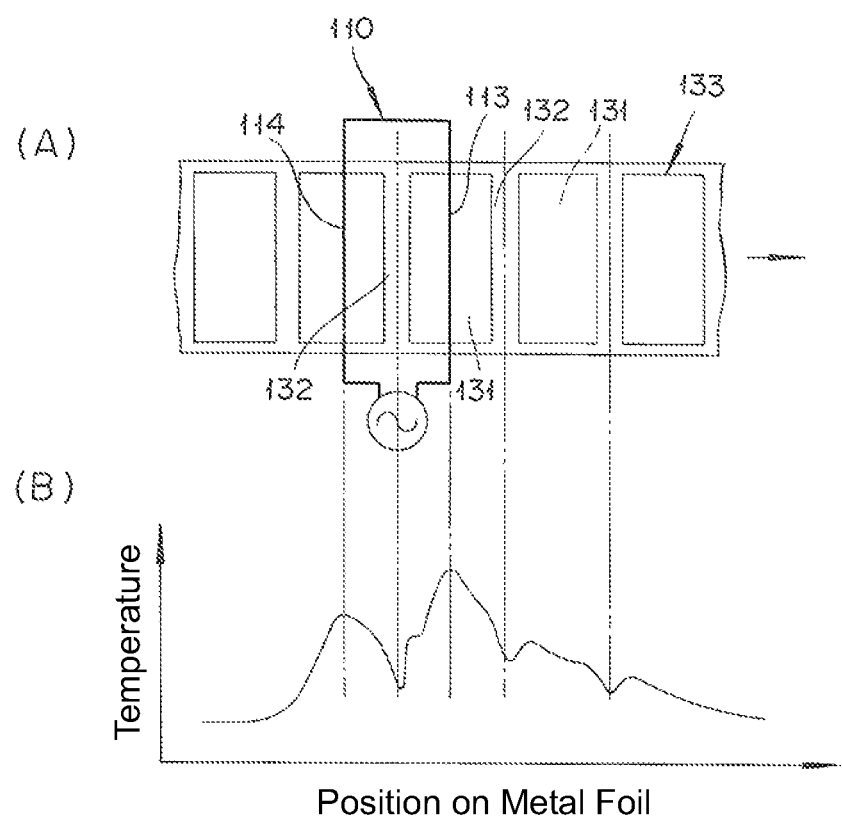
FIG. 10 includes in (A) a top view illustrating an example of a positional relation between a metal foil and an inductive coil moving relative to each other and in (B) a temperature distribution of the metal foil at the time when the positional relation illustrated in (A) is achieved.
Figure 11:
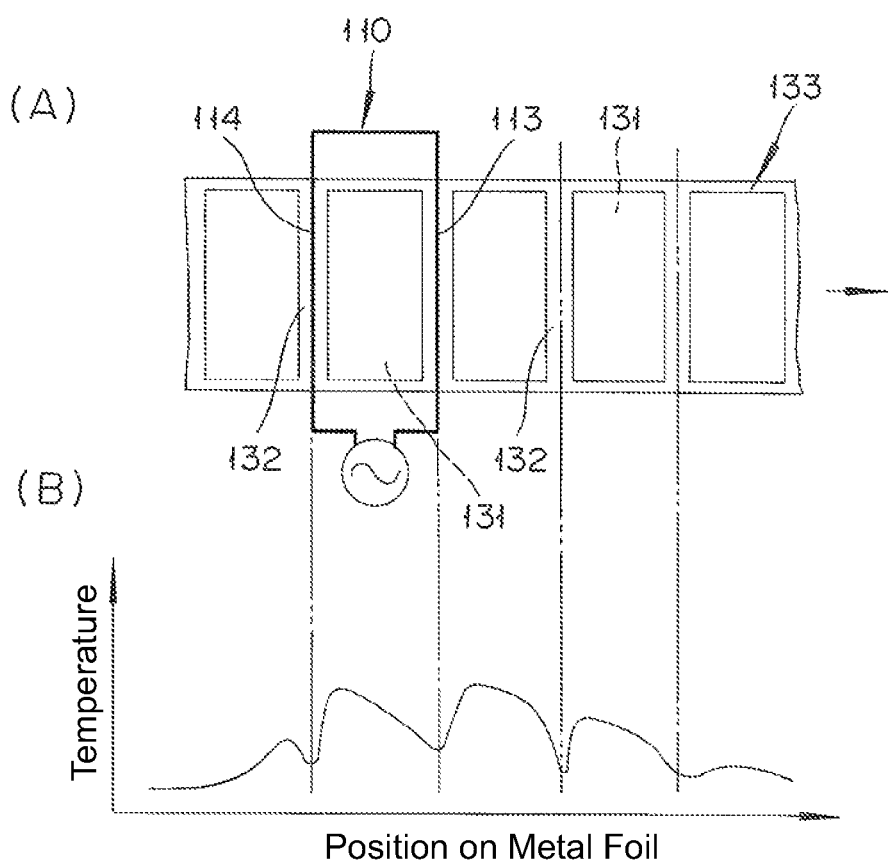
FIG. 11 includes in (A) is a top view illustrating a condition in which the inductive coil reaches an uncoated portion by relatively moving the metal foil and the inductive coil from the positional relation as shown in FIG. 10 and in (B) a temperature distribution of the metal foil at the time when the positional relation illustrated in (A) is achieved.

As a result, as illustrated in (A) and (B) of FIGS. 10 and 11, temperature of the uncoated portions 132 can be kept lower than that of the coated portions 131, and an excessive temperature rise at the uncoated portions 132 can be avoided. Therefore, according to the first embodiment, deterioration of the metal foil 130 and so on can be avoided and improvement of quality can be achieved.

According to the first embodiment, the inductive heating portions 113 and 114 are spaced apart from each other by a distance equal to a pitch P and are concurrently aligned with respective different uncoated portions 132. In addition, the inductive heating portions 115 and 116 are arranged to be spaced apart from each other by a distance equal to a pitch P and are concurrently aligned with respective different uncoated portions 132.

Hence, when one pair of the inductive heating portions 113 and 115, for example, is aligned with the uncoated portion 132 and the output is reduced, the other pair of the inductive heating portions 114 and 116 would not be aligned with the coated portions 131 and the amount of heat applied to the coated portions 131 would not be reduced. As a result, the electrode material 133 can be uniformly heated.

In the first embodiment, the inductive heating portions 113, 114, 115 and 116 apply inductive heating on both sides of the metal foil 130. As a result, the first embodiment enables the application of heat to the coated portions 131 more efficiently than applying heat to just one side of the metal foil 130, thereby improving productivity by reducing drying time.

Figure 12:
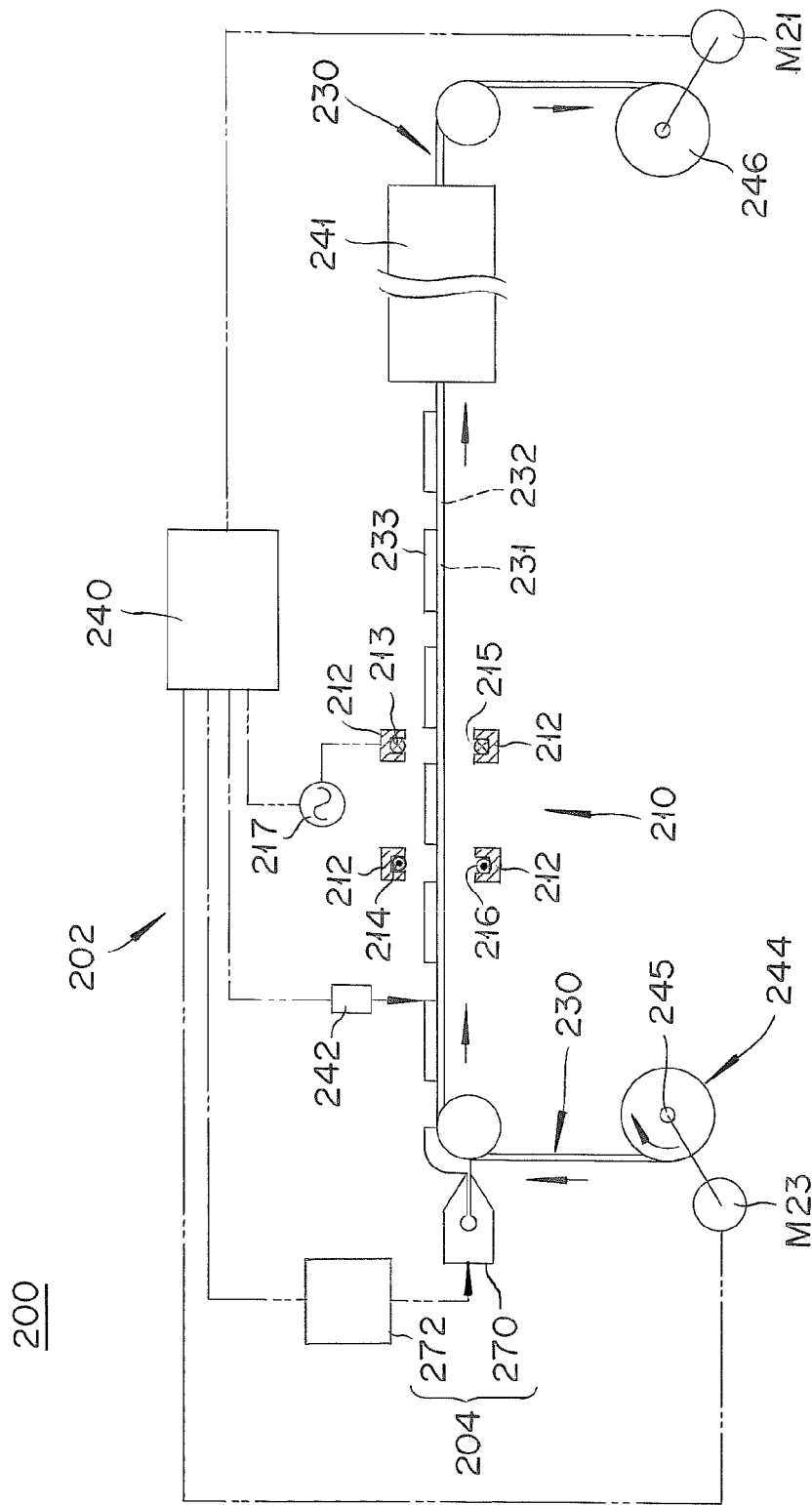
FIG. 12 is a schematic diagram of an apparatus for coating and drying an electrode material according to a second embodiment.
Figure 13:
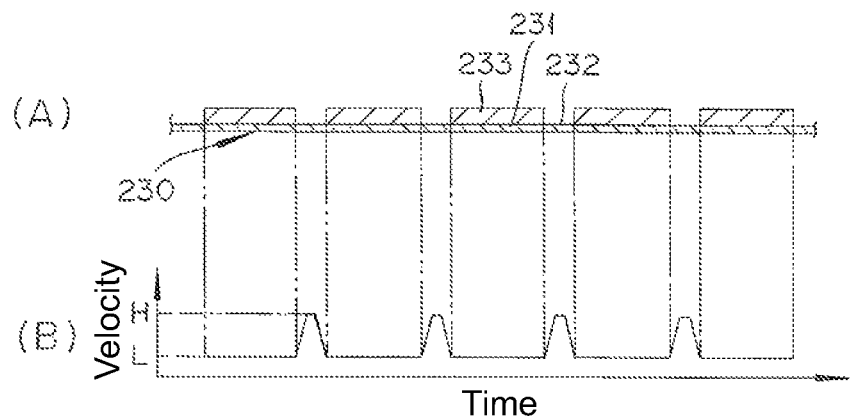
FIG. 13 includes in (A) a sectional view showing a metal foil on which electrode material portions are intermittently arranged and in (B) a graph illustrating a variation in conveying velocity of a conveyed metal foil.

An apparatus for coating and drying an electrode material according to a second embodiment is described with references to FIGS. 12 and 13.

As shown in FIG. 12, the coating and drying apparatus 200 according to the second embodiment has a generally similar configuration as that of the first embodiment but is different in that a motor M23 is connected to an axis 245 of a supply roll 244.

In general, a controller 240 controls a conveyer to increase velocity of a metal foil 230 relative to an inductive coil 210 so that an amount of heat applied to uncoated portions 232 is below that applied to coated portions 231 when the metal foil 230 and the inductive coil 210 are relatively moved in the arrangement direction (that is, the direction in which electrode material portions 233 are arranged) in order to evaporate a solvent by inductively heating the metal foil 230 to generate heat. The conveyer has the supply roll 244, a take-up roll 246 and a plurality of support rolls (not shown) supporting a lower side of the metal foil 230.

The controller 240 is electrically connected to a motor M21 and the motor M23 and controls the supply roll 244 and the take-up roll 246 by controlling rotational velocities of the motor M21 and the motor M23, respectively.

The controller 240 synchronizes the motors M21 and M23 so that they have the same rotational velocity and increases or decreases the rotational velocities of the motors M21 and M23, respectively, based on a signal from a sensor 242.

When the controller 240 controls the motors M21 and M23 and changes moving velocity of the metal foil 230 relative to the inductive coil 210 so that inductive heating portions 213, 214, 215 and 216 are aligned with at least parts of the uncoated portions 232, the amount of heat applied to the metal foil 230 is reduced in comparison with a case where the inductive heating portions 213, 214, 215 and 216 are aligned with the coated portions 231.

As shown in FIG. 13, for example, the controller 240 keeps the rotational velocities of the motors M21 and M23 constant, thus keeping the moving velocity of the metal foil 230 at constant velocity of L, while the inductive heating portions 213, 214, 215 and 216 are aligned with the coated portions 231.

Thereafter, while the inductive heating portions 213, 214, 215 and 216 are aligned with the uncoated portions 232, the controller 240 increases the rotational velocities of the motors M21 and M23 until the moving velocity of the metal foil 230 reaches velocity H. In this manner, the controller 240 reduces the amount of heat applied to the uncoated portions 232.

The moving velocity H of the metal foil 230 may be, for example, 2 m/min, and the moving velocity L of the metal foil 230 may be, for example, 1 m/min. In addition, in this embodiment, the controller 240 keeps an output of a high frequency power supply 217 constant.

As described above, in the second embodiment, while the inductive heating portions 213, 214, 215 and 216 are aligned with at least parts of the uncoated portions 232, the amount of heat applied to the metal foil 230 is reduced in comparison with the case where the inductive heating portions 213, 214, 215 and 216 are aligned with the coated portions 231. Thus, an excessive temperature rise at the uncoated portions 232 is inhibited and quality improvement can be achieved as is the case with the first embodiment. In addition, the second embodiment is generally similar to the first embodiment and provides the same additional effects as the first embodiment.

In this embodiment, although the amount of heat applied to the metal foil 230 is changed by controlling the rotational velocities of the motors M21 and M23 in order to change the moving velocity of the metal foil 230 relative to the inductive coil 210, controlling the output of the high frequency power supply may be simultaneously used, as further described in relation to the first embodiment. In this case, a variation in the moving velocity and a variation in the output may be smaller values than those described in relation to each of the embodiments.

Figure 14:
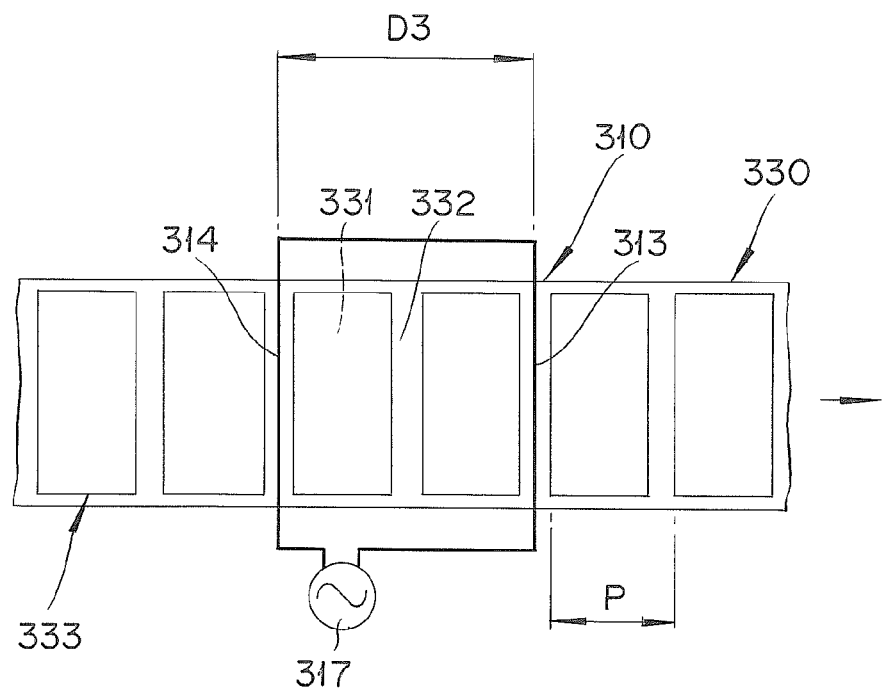
FIG. 14 is a top view illustrating main parts of an apparatus for drying an electrode material according to a third embodiment.

An apparatus for drying an electrode material according to a third embodiment is described with reference to FIG. 14. The third embodiment has a generally similar configuration as that of the first and second embodiments, but differs in that inductive heating portions 313, 314 receiving output from high frequency power supply 317 are arranged to be spaced apart by a distance D3, which is twice the pitch P (i.e., D3=2*P), in the arrangement direction of the electrode material portions 333 on a surface of a metal foil 330. The electrode material portions 333 form coated portions 331 separated by uncoated portions 332 of the metal foil 330.

Hence, in the third embodiment, a time interval from a time point when a coated portion 331 passes through an inductive heating portion 314 to a time point when the coated portion 331 reaches an inductive heating portion 313 is longer than that of the first embodiment, and temperature of the coated portion 331 is reduced below that of the first or second embodiment during a movement of the coated portion 331. Therefore, the third embodiment has an effect in addition to the effects of the first and second embodiments in that an excessive temperature rise of the coated portion 331 can be inhibited.

In particular, if a thickness of the metal foil 330 or the electrode material 333 is thin, the third embodiment is advantageously applicable because temperature is likely to rise due to a decrease in thermal capacity. In addition, if the pitch P is small and it is difficult, for example, to process a copper pipe as a coil body to be matched with the pitch P, the third embodiment is also advantageously applicable.

Figure 15A:
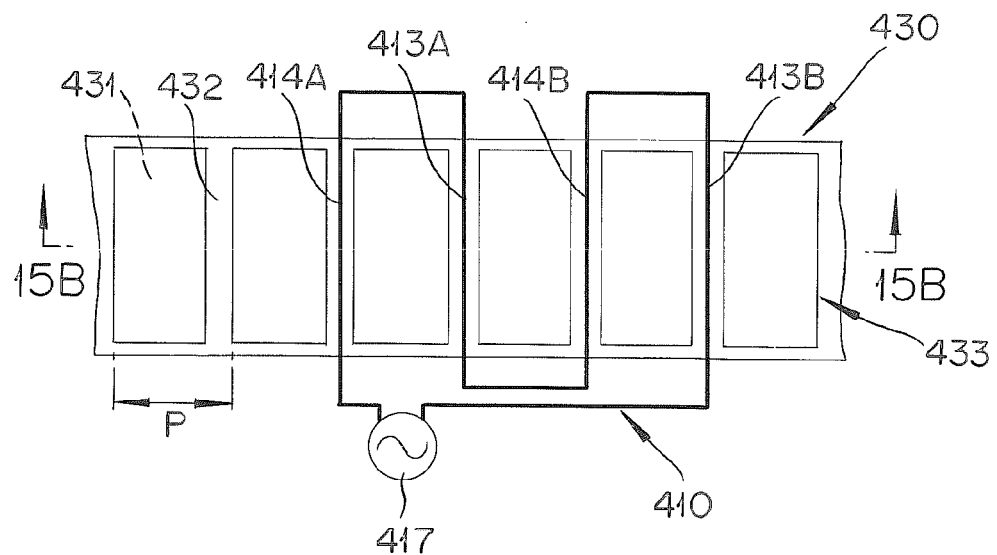
FIG. 15A is a top view illustrating main parts of an apparatus for drying an electrode material according to a fourth embodiment.
Figure 15B:
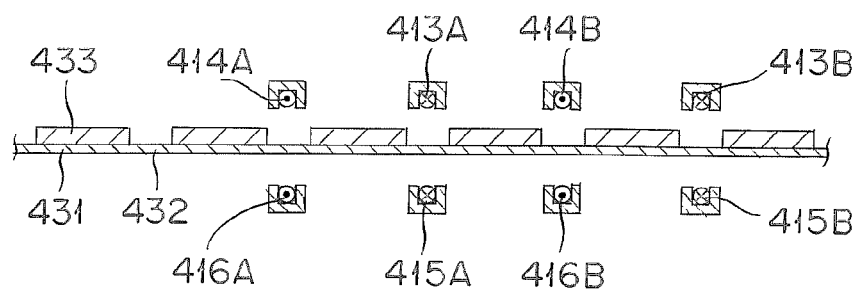
FIG. 15B is a sectional view taken along line 15B-15B in FIG. 15A.

FIG. 15A is a top view illustrating main parts of an apparatus for drying an electrode material according to a fourth embodiment, and FIG. 15B is a sectional view taken along a line 15B-15B in FIG. 15A.

As shown in FIG. 15A, the fourth embodiment has a generally similar configuration as that of the first or second embodiment, but differs in that inductive coil 410 is formed in a comb-shaped configuration.

As best shown in FIG. 15B, four inductive heating portions 413A, 414A, 413B and 414B are arranged at one side of a metal foil 430, and four inductive heating portions 415A, 416A, 415B and 416B are arranged at the other side of the metal foil 430. Inductive heating portions adjacent to each other in the arrangement direction of the electrode material portions 433 on a surface of the metal foil 430 are spaced apart by a distance equal to a pitch P. The electrode material portions 433 form coated portions 431 separated by uncoated portions 432 of the metal foil 430.

The fourth embodiment provides the same effects as the first or second embodiment. In addition, since the fourth embodiment is operable to heat four locations of the metal foil 430 by a single high frequency power supply 417, the fourth embodiment can reduce cost of the apparatus in comparison with a case where four locations are heated by two inductive coils as in the first or second embodiment.

An apparatus for drying an electrode material according to a fifth embodiment is described with reference to FIGS. 16-20.

Figure 16:
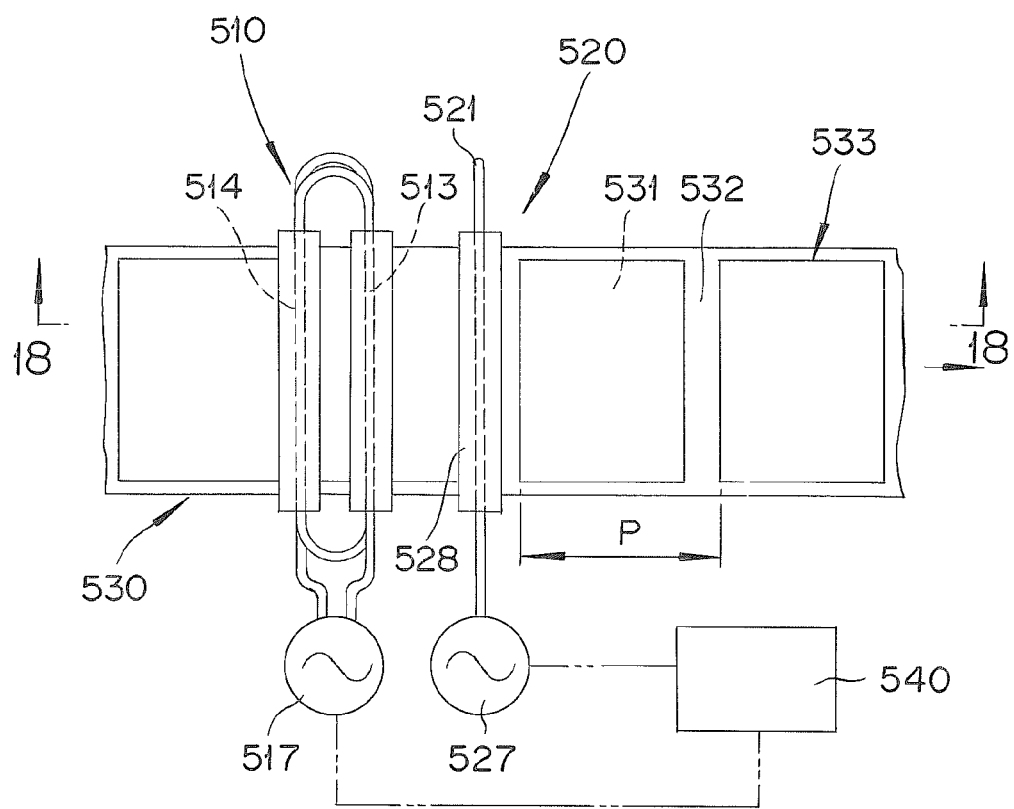
FIG. 16 is a top view illustrating main parts of an apparatus for drying an electrode material according to a fifth embodiment.

The fifth embodiment has a generally similar configuration as that of the first or second embodiment, but differs, as shown in FIG. 16, in that the apparatus for drying the electrode material includes not only an inductive coil 510 having a generally similar structure as an inductive coil 110, but also an auxiliary inductive coil 520 facing a metal foil 530 and inductively heating the metal foil 530. In addition, the apparatus for drying the electrode material according to the fifth embodiment has a power supply 527 for supplying power to the auxiliary inductive coil 520. A controller 540 controls a high frequency power supply 517 supplying power to the inductive coil 510 and the power supply 527 for the auxiliary inductive coil 520.

The inductive coil 510 includes at least two, first and second, inductive heating portions extending transversely to the arrangement direction of the electrode material portions 533 and spaced apart in the arrangement direction.

Inductive heating portions 513 and 514 located at one side of the metal foil 530 constitute the first and second inductive heating portions. Inductive heating portions 515 and 516, located at the opposite side of the metal foil 530 (see FIG. 18), also constitute the first and second inductive heating portions.

The inductive coil 510 differs from the inductive coil 110 in the first embodiment in that a distance between the first and second inductive heating portions is not the same as the inductive coil 110. The distance between the first and second inductive heating portions of the inductive coil 510 is such that the second inductive heating portion is aligned with a coated portion 531 when the first inductive heating portion is aligned with an uncoated portion 532 and the first inductive heating portion is aligned with the coated portion 531 when the second inductive heating portion is aligned with the uncoated portion 532.

The auxiliary inductive coil 520 is located downstream of at least one of the first and second inductive heating portions of the inductive coil 510 in the arrangement direction in which the metal foil 530 moves. In this embodiment, the auxiliary inductive coil 520 is located downstream of the inductive heating portions 513 and 515 of the inductive coil 510 in the arrangement direction. The auxiliary inductive coil 520 is arranged such that a magnetic flux it produces can transmit through the metal foil 530 in a direction perpendicular to a surface of the metal foil 530.

Figure 18:
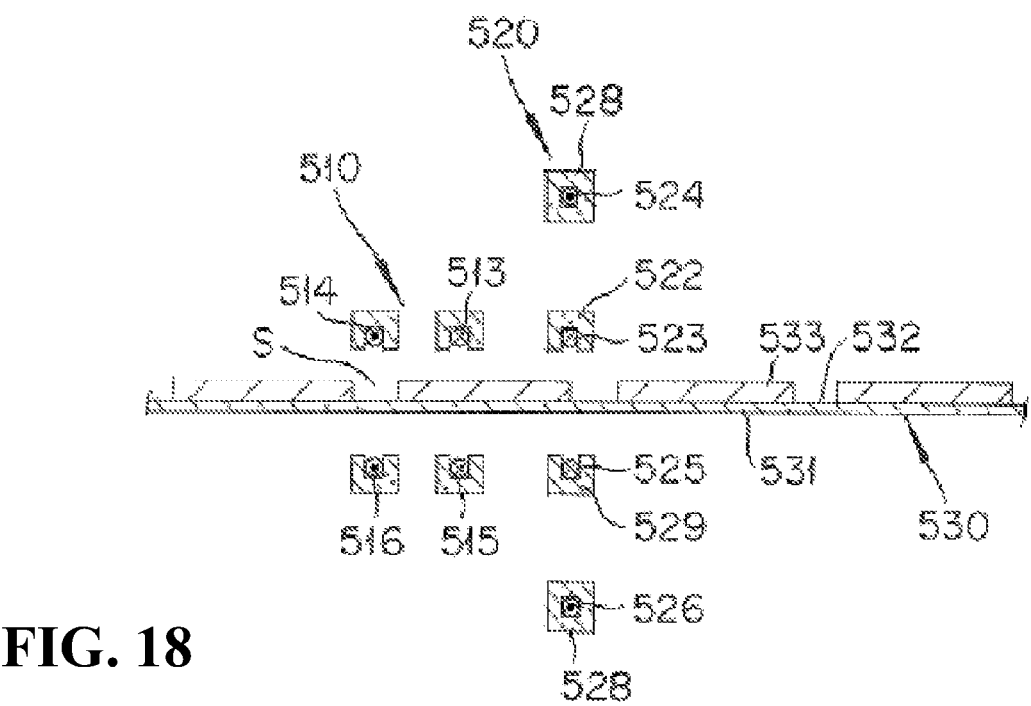
FIG. 18 is a sectional view take along line 18-18 in FIG. 16.
Figure 19:
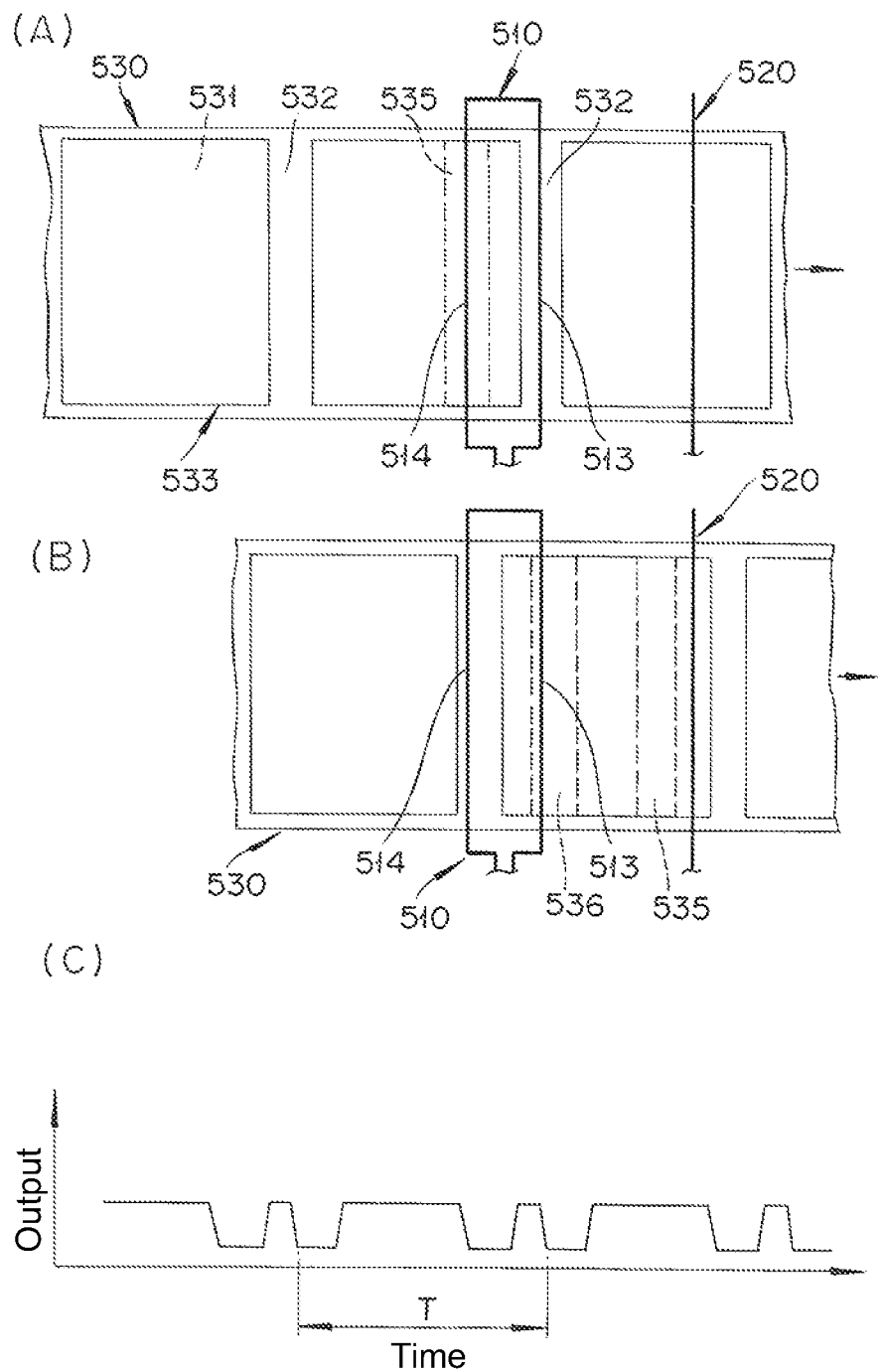
FIG. 19 includes in (A) and (B) top views illustrating examples of a positional relation between a metal foil and an inductive coil moving relative to each other and in (C) a graph illustrating a variation in an output of a high frequency power supply.
Figure 20:
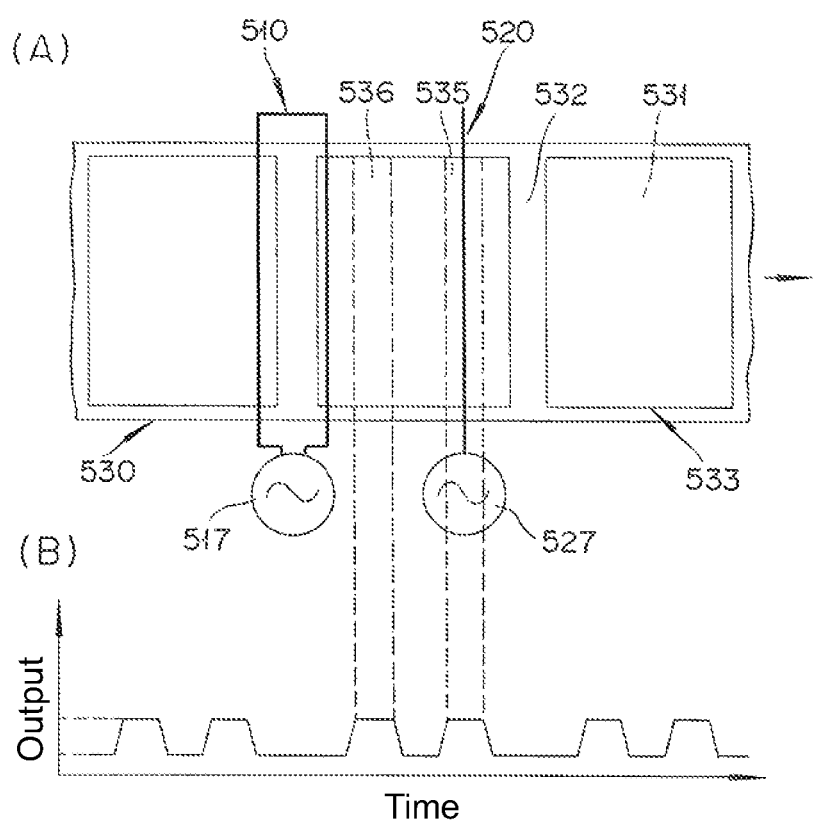
FIG. 20 includes in (A) a top view illustrating an example of a positional relation between a metal foil and an auxiliary inductive coil moving relative to each other and in (B) a graph illustrating a variation in an output of a high frequency power supply.

The auxiliary inductive coil 520 has a coil body 521 through which AC current flows and long magnetic cores 522 and 529 made of ferrite (see FIG. 18). The auxiliary inductive coil 520 is electrically connected to the power supply 527. The magnetic cores 522 and 529 form a magnetic path that transmits the magnetic flux produced by the auxiliary inductive coil 520 through the metal foil 530 in the direction perpendicular to the surface of the metal foil 530.

Figure 17:
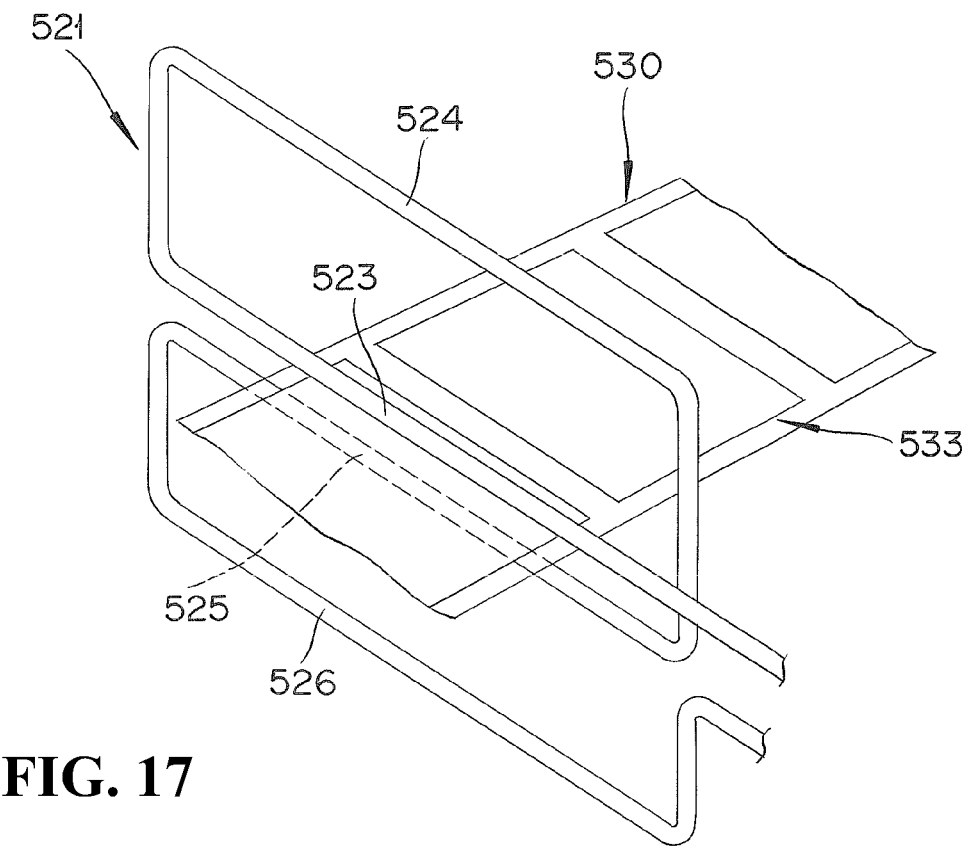
FIG. 17 is a perspective view showing an auxiliary inductive coil.

As shown in FIG. 17, the coil body 521 of the auxiliary inductive coil 520 is formed, for example, by folding a copper pipe. An interior of the coil body 521 is in communication with a chiller (not shown) for feeding cooling water. During inductive heating, the cooling water supplied from the chiller is circulated through the interior of the coil body 521, and an increase in temperature of the coil body 521 is inhibited.

The auxiliary inductive coil 520 includes at least two, first and second, auxiliary inductive heating portions extending transversely to the arrangment direction of the electrode material portions 533 and spaced apart in a direction perpendicular to the surface of the metal foil 530.

In FIG. 17, auxiliary inductive heating portions 523 and 524 located at an upper side of the metal foil 530 supporting the electrode material portions 533 constitute first and second auxiliary inductive heating portions. Auxiliary inductive heating portions 525 and 526 located at the opposing, lower side of the metal foil 530 also constitute the first and second auxiliary inductive heating portions.

The auxiliary inductive heating portions 523 and 524 are spaced apart in a direction perpendicular to the surface of the metal foil 530. The auxiliary inductive heating portions 525 and 526 are also spaced apart in a direction perpendicular to the surface of the metal foil 530.

The auxiliary inductive heating portions 523 and 525 are opposed to each other with the metal foil 530 interleaved therebetween. In other words, the auxiliary inductive coil 520 includes a pair of the auxiliary inductive heating portions 523 and 525 opposed to each other with the metal foil 530 interleaved therebetween.

The power supply 527 for the auxiliary inductive coil 520 makes current flow through the pair of the auxiliary inductive heating portions 523 and 525 in the same direction. Hence, one induced current produced in the metal foil 530 by lines of magnetic force coming from the auxiliary inductive heating portion 523 and another induced current produced in the metal foil 530 by lines of magnetic force coming from the inductive heating portion 525 flow in the same direction without cancelling out each other. Therefore, the metal foil 530 can generate enough Joule heat to complete drying of the electrode material portions 533.

Preferably, directions in which the auxiliary inductive coil 520 extend and the arrangement direction of the electrode material portions 533 are orthogonal to each other. During a movement of the metal foil 530, the auxiliary inductive coil 520 would concurrently overlap on edges of the electrode material portions 533 and would concurrently leave the edges of the electrode material portions 533 viewed from a transverse direction of the metal foil 530. Hence, the electrode material portions 533 can be uniformly heated in the transverse direction of the metal foil 530 even if an amount of heat applied to the metal foil 530 is controlled to be decreased or increased.

As shown in FIG. 18, the auxiliary inductive coil 520 is provided with the magnetic core 522 in the auxiliary inductive heating portion 523 and the magnetic core 529 in the auxiliary inductive heating portion 525. The auxiliary inductive coil 520 further includes a shield member 528 for reducing a leakage magnetic flux by shielding one of the first and second auxiliary inductive heating portions of the auxiliary inductive coil 520 that is further from a surface of the metal foil 530. In this embodiment, the auxiliary inductive heating portions 524 and 526, as shown in FIG. 18, constitute an auxiliary inductive heating portion that is further from the surface of the metal foil 530.

The shield member 528 is made of ferrite. The shield member 528 surrounds the whole of the perimeter of the auxiliary inductive heating portions 524 and 526 and inhibits lines of magnetic force produced by the auxiliary inductive heating portions 524 and 526 from acting on a peripheral object such as, for example, a casing of the apparatus.

A method for drying an electrode material according to the fifth embodiment is next described.

In drying an electrode material 533, when a first inductive heating portion of an inductive coil 510 is aligned with an uncoated portion 532, a second inductive heating portion of the inductive coil 510 is aligned with a coated portion 531. Further, when the second inductive heating portion is aligned with the uncoated portion 532, the first inductive heating portion is aligned with the coated portion 531. In this case, while the first or second inductive heating portion is aligned with the uncoated portion 532, an amount of heat applied to a metal foil 530 is reduced in comparison with the case where the first or second inductive heating portion is aligned with the coated portion 531.

In addition, as the auxiliary inductive coil 520 is opposed to the metal foil 530 and the first inductive heating portion of the inductive coil 510 is aligned with the uncoated portion 532, a first region 535 in the coated portion 531, to which the second inductive heating portion of the inductive coil 510 moves relatively, is heated by the auxiliary inductive coil 520. As the second inductive heating portion of the inductive coil 510 is aligned with the uncoated portion 532, a second region 536 in the coated portion 531, to which the first inductive heating portion of the inductive coil 510 moves relatively, is also heated by the auxiliary inductive coil 520. More details are now explained with initial reference to FIGS. 19A-19C.

At first, the moving metal foil 530 is inductively heated by the inductive coil 510 in order to evaporate a solvent in the electrode material 533. During this time, as shown in FIGS. 19A and 19B, when the inductive heating portions 513 and 515 are aligned with the uncoated portion 532, the inductive heating portions 514 and 516 are aligned with the coated portion 531. In contrast, when the inductive heating portions 514 and 516 are aligned with the uncoated portion 532, the inductive heating portions 513 and 515 are aligned with the coated portion 531.

The controller 540 reduces an amount of heat applied to the metal foil 530 when the inductive heating portions 513 and 515 are aligned with the uncoated portions 532 in comparison with the case that the inductive heating portions 513 and 515 are aligned with the coated portion 531. The controller 540 also reduces the amount of heat applied to the metal foil 530 when the inductive heating portions 514 and 516 are aligned with the uncoated portion 532 in comparison with the case that the inductive heating portions 514 and 516 are aligned with the coated portion 531.

In other words, as shown in FIG. 19C, during a time interval T from a time point when the inductive coil 510 starts to be aligned with one of the coated portions 531 to a time point when the inductive coil 510 and the one of the coated portions 531 start not to be aligned with each other, the controller 540 reduces an output almost twice. It is noted that the controller 540 may reduce the amount of heat applied by changing velocity of the metal foil relative to the inductive coil as is the case with the second embodiment.

As shown in FIGS. 20A and 20B, the controller 540 also controls a power supply 527 for an auxiliary inductive coil so that as the inductive heating portions 513 and 515 are aligned with the uncoated portion 532, a region 535 in the coated portion 531, to which the inductive heating portions 514 and 516 move relatively, is heated by the auxiliary inductive coil 520. Similarly, as the inductive heating portions 514 and 516 are aligned with the uncoated portion 532, a region 536 in the coated portion 531, to which the inductive heating portions 513 and 515 move relatively, is also heated by the auxiliary inductive coil 520 using power supply 527. It is noted that the regions 535 and 536 correspond to the above-mentioned first and second regions, respectively.

When the metal foil 530 moves, and the auxiliary inductive heating portions 523 and 525 of the auxiliary inductive coil 520 are aligned with the regions 535 and 536 in the coated portion 531, respectively, the controller 540 heats regions 535 and 536, causing them to generate heat.

The amount of heat applied by the auxiliary inductive coil 520 compensates for a reduction in the amount of heat applied to the coated portion 531 while the inductive heating portions 513 and 515 or the inductive heating portions 514 and 516 are aligned with the uncoated portion 532.

As described above, the fifth embodiment is effective in equalizing the amount of heat applied to the coated portion 531 by compensating for an amount of heat required to keep solvent concentration in the electrode material 533 equal to or smaller than a desired value with the inductive coil 520 and provides similar effects as the first or second embodiment.

Figure 21:
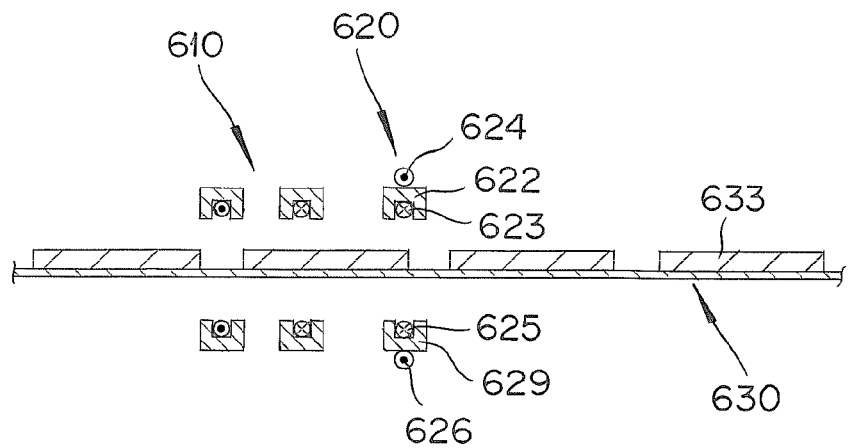
FIG. 21 is a sectional view illustrating main parts of an apparatus for drying an electrode material according to sixth embodiment.

FIG. 21 is a sectional view illustrating main parts of an apparatus for drying an electrode material according to a sixth embodiment.

The sixth embodiment is generally similar to the fifth embodiment but differs in that a shield member is not provided. Also, auxiliary inductive heating portions 624 and 626 located at a distal side from a surface of a metal foil 630 are in contact with magnetic cores 622 and 629 provided in auxiliary inductive heating portions 623 and 625 located at facing sides to the surface of the metal foil 630. An inductive coil 610 has a generally similar structure as the inductive coil 510 in the fifth embodiment.

Referring to FIG. 21, in general, an auxiliary inductive coil 620 opposed to the metal foil 630 and inductively heating the metal foil 630 includes at least two, first and second, auxiliary inductive heating portions extending transversely to the arrangement direction of the electrode material portions 633 are arranged and spaced apart from each other in a direction perpendicular to a surface of the metal foil 630.

In FIG. 21, auxiliary inductive heating portions 623 and 624 facing an upper side of the metal foil 630 constitute first and second auxiliary inductive heating portions, and auxiliary inductive heating portions 625 and 626 facing a lower side of the metal foil 630 also constitute the first and second auxiliary inductive heating portions.

The auxiliary inductive coil 620 has magnetic cores 622 and 629, wherein the cores 622 and 629 are provided in one of the first and second auxiliary inductive heating portions of the auxiliary inductive coil 620 located a proximal side from a surface of the metal foil 630, and the cores 622 and 629 form a magnetic path for transmitting a magnetic flux produced by the auxiliary inductive heating portion located at a proximal side from the surface of the metal foil 630 in a direction perpendicular to the surface of the metal foil 630. The auxiliary inductive heating portion 624 is in contact with the magnetic core 622. The auxiliary inductive heating portion 626 is also in contact with the magnetic core 629.

In this manner, a part of the magnetic flux produced by the auxiliary inductive heating portion located at the distal side from the surface of the metal foil 630 is transmitted in the direction perpendicular to the surface of the metal foil 630 by contacting the auxiliary inductive heating portion located at the distal side from the surface of the metal foil 630 with the magnetic cores 622 and 629. Therefore, the sixth embodiment provides an additional effect in addition to the effects of the fifth embodiment in that the metal foil 630 can be inductively heated in a more effective manner.

It is noted that, in this embodiment, since exposed auxiliary inductive heating portions 624 and 626 are located near the magnetic cores 622 and 629, and the auxiliary inductive heating portions 624 and 626 are spaced apart from a peripheral object, for example, a casing of the apparatus and so on, lines of magnetic force can be prevented from having an influence on the peripheral object.

Figure 22:
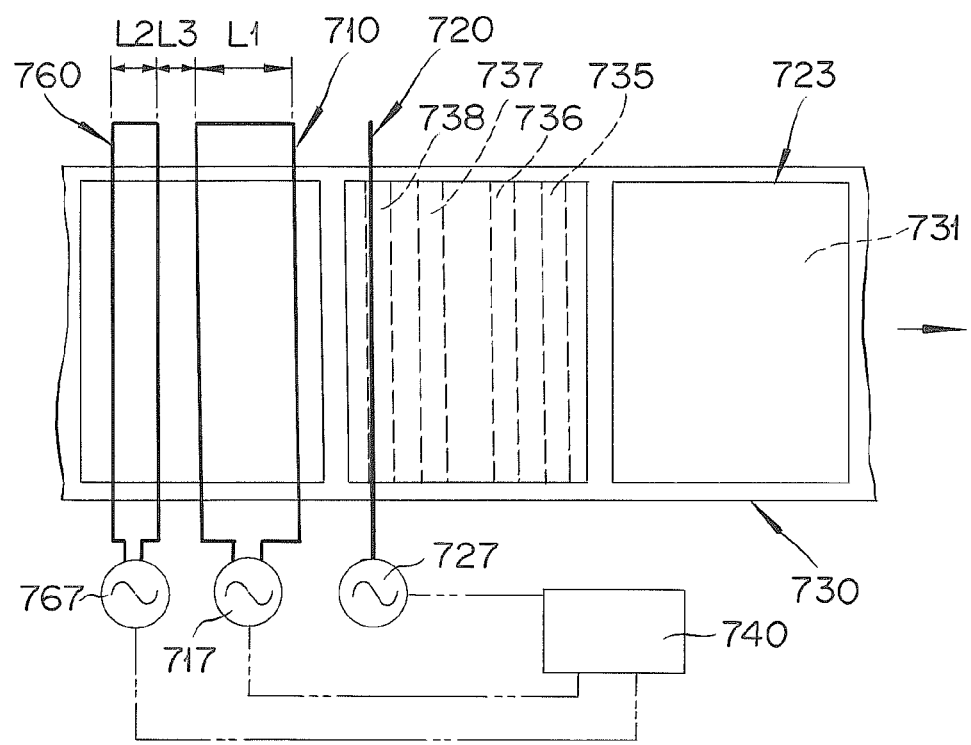
FIG. 22 is a top view illustrating main parts of an apparatus for drying an electrode material according to seventh embodiment.

FIG. 22 is a top view illustrating main parts of an apparatus for drying an electrode material according to a seventh embodiment.

The seventh embodiment is generally similar to the fifth embodiment but differs in that this embodiment includes a plurality of inductive coils wherein each of the inductive coils is generally similar to an inductive coil 510 in the fifth embodiment.

Referring to FIG. 22, in general, the apparatus for drying the electrode material according to the seventh embodiment has a plurality of sets of inductive coils and power supplies in order to form a plurality of first regions and a plurality of second regions in one coated portion 731.

In particular, the apparatus for drying the electrode material according to the seventh embodiment has two sets of inductive coils 710 and a high frequency power supply 717 and an inductive coil 760 and a high frequency power supply 767. A controller 740 controls the high frequency power supplies 717 and 767.

Two first regions and two second regions are formed in the coated portion 731 by inductive heating with the inductive coils 710 and 760. Regions 735, 736, 737 and 738 in FIG. 22 correspond to the first and second regions.

A distance L1 between inductive heating portions in the inductive coil 710, a distance L2 between inductive heating portions in the inductive coil 760, and a spacing width L3 between the inductive coil 710 and the inductive coil 760 are adjusted such that the regions 735, 736, 737 and 738 do not overlap with each other.

The controller 740 controls a power supply 727 for an auxiliary inductive coil 720 in order to heat the plurality of the first and second regions 735, 736, 737 and 738 using one auxiliary inductive coil 720 for the plurality of the inductive coils 710 and 760.

This embodiment provides an additional effect, in addition to the effects of the fifth embodiment, in that utilization of the auxiliary inductive coil is improved over a configuration in which an individual auxiliary inductive coil is provided for each of a plurality of inductive coils. Furthermore, this embodiment provides a further additional effect in that equipment cost can be more reduced than a configuration in which an individual auxiliary inductive coil is provided for each of a plurality of inductive coils.

An apparatus for drying an electrode material according to an eighth embodiment is described with reference to FIG. 23 and FIG. 24.

The eighth embodiment is generally similar to the fifth embodiment but differs in that an auxiliary inductive coil is located between a first inductive heating portion and a second inductive heating portion of an inductive coil.

Figure 23:
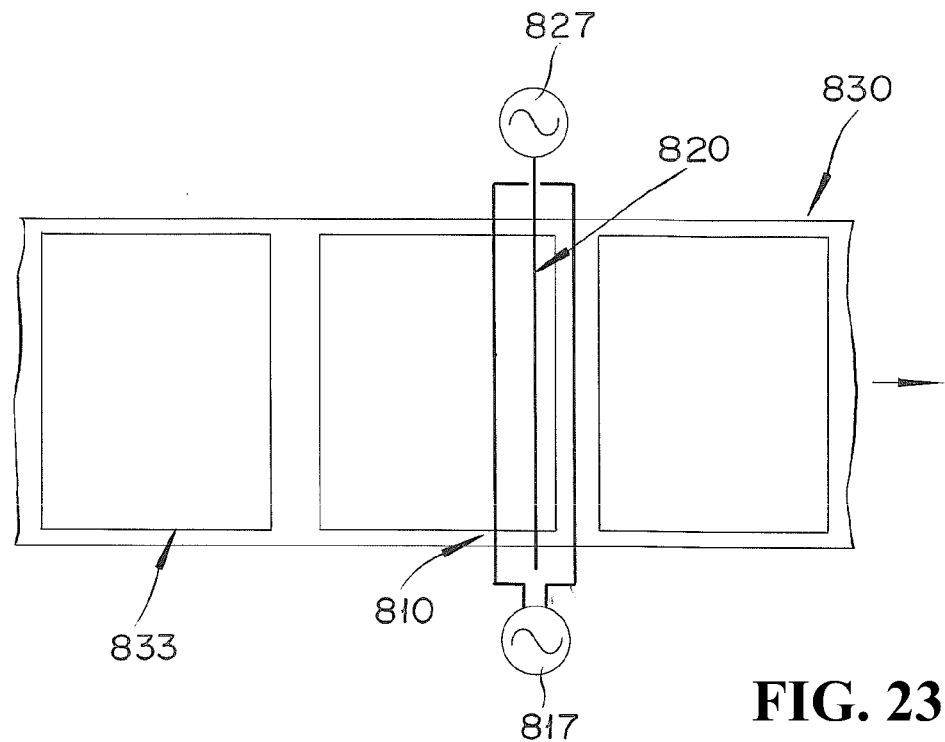
FIG. 23 is a top view illustrating main parts of an apparatus for drying an electrode material according to eighth embodiment.

As shown in FIG. 23, an auxiliary inductive coil 820 similar to an auxiliary inductive coil 520 in the fifth embodiment is located between inductive heating portions of an inductive coil 810 similar to an inductive coil 510 in the fifth embodiment.

As described above in connection with the fifth embodiment, since ferrite used as a magnetic core and a shield member covers a coil body of an inductive coil and a coil body of an auxiliary inductive coil, the inductive coil 810 and the auxiliary inductive coil 820 can be densely arranged.

With this configuration, the eighth embodiment provides, in addition to the effects of the fifth embodiment, an additional effect in that the apparatus can be realized in a small size.

Figure 24:
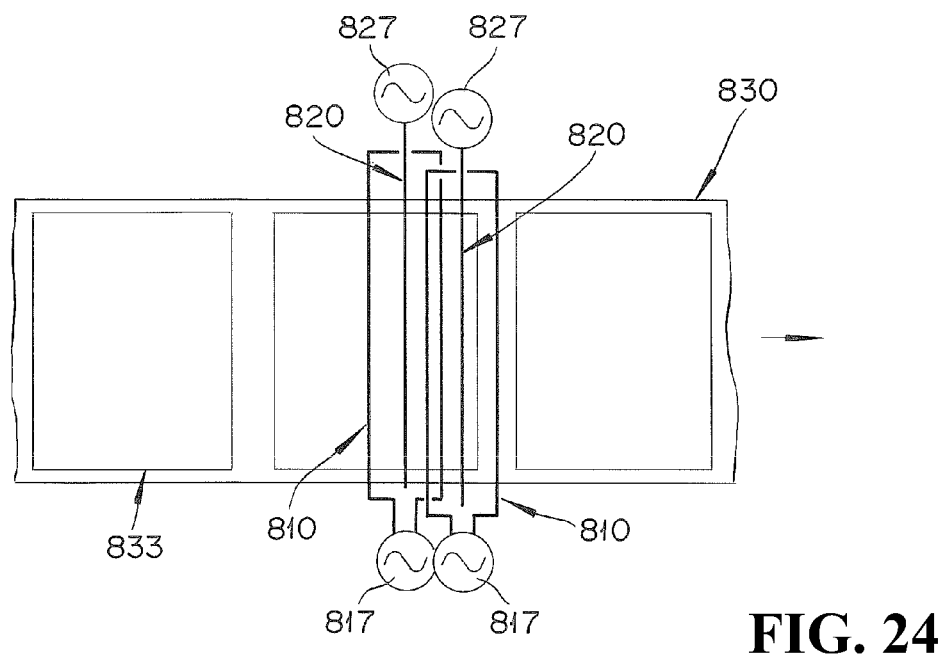
FIG. 24 is a top view illustrating a variation of the eighth embodiment.

Furthermore, as shown in FIG. 24, two sets of the inductive coil 810 and the auxiliary inductive coil 820 may be provided. In this case, the apparatus can be realized in a small size by partially overlapping different inductive coils 810 with each other.

Figure 25:
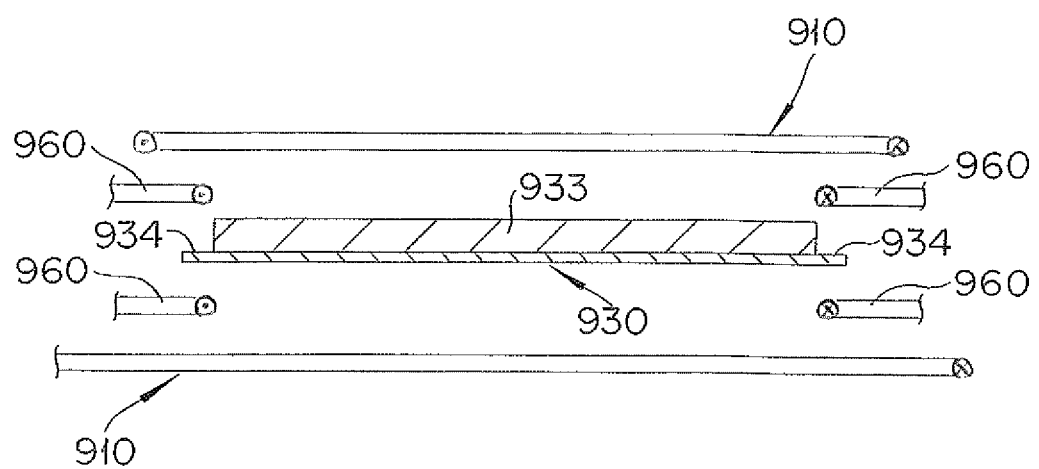
FIG. 25 is a sectional view illustrating main parts of an apparatus for drying an electrode material according to ninth embodiment.

FIG. 25 is a sectional view illustrating main parts of an apparatus for drying an electrode material according to ninth embodiment.

The apparatus for drying the electrode material according to the ninth embodiment has a configuration of one of the first to eighth embodiments and further has antimagnetic means arranged in an exposed portion 934 of a metal foil 930 and attenuating magnetic flux acting on the exposed portion 934.

As shown in FIG. 25, the antimagnetic means may be, for example, a cancelling coil 960 for generating lines of magnetic force so that influence of lines of magnetic force generated by the inductive coil 910 on the exposed portion 934 can be cancelled out.

With this configuration, the ninth embodiment provides an additional effect, in addition to the effects of one of the first to eighth embodiments, in that an excessive temperature rise on the exposed portion 934 can be inhibited.

The invention is not limited to the above-mentioned embodiments, but may be variously modified within the scope of the appended claims. For example, a distance between inductive heating portions is not limited to a value identical to a pitch P by which electrode material portions are arranged, but may have any values equal to the pitch P multiplied by a natural number, for example, a value equal to the pitch P multiplied by 3.

Furthermore, a waveform of an output of a high frequency power supply is not limited to the above-mentioned examples, but may be variously established. For example, duty ratio may be changed between an interval when inductive heating portions are aligned with a coated portion and an interval when the inductive heating portions are aligned with an uncoated portion so that an excessive temperature rise in the uncoated portion can be inhibited.

In the above-mentioned embodiments, a metal foil is moved relative to an inductive coil, but the invention is not limited thereto. In other words, the metal foil and the inductive coil are moved relatively, and the invention includes an embodiment in which the inductive coil is moved relative to the metal foil.

Accordingly, the above-described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for drying electrode material intermittently coated on a surface of a metal foil comprising:
    an inductive coil opposed to the metal foil having a length greater than a width;
    a conveyer configured to move at least one of the metal foil lengthwise relative to the inductive coil and the inductive coil along the length of the metal foil, wherein the electrode material is positioned intermittently along the length of the metal foil on a common side of the metal foil with an uncoated portion of the metal foil positioned between adjacent intermittent coated portions of metal foil to alternate between coated and uncoated portions lengthwise along the length of the metal foil, the electrode material and uncoated portion located in substantially the same plane;
    a power supply supplying power to the inductive coil;
    a sensor configured to detect a border between the uncoated portion and a coated portion of the metal foil; and
    a control unit configured to:
        control at least one of the conveyer and the power supply to reduce an amount of heat applied to the uncoated portions below an amount of heat applied to the coated portions based on the border detected by the sensor, wherein the control unit reduces the amount of heat applied to the uncoated portions below the amount of heat applied to the coated portions by controlling the power supply to reduce power supplied to the inductive coil when the inductive coil is opposed to the uncoated portions and increase power supplied to the inductive coil when the inductive coil is opposed to the coated portions and by controlling the conveyer to increase a relative velocity of the metal foil with respect to the inductive coil when the inductive coil is opposed to the uncoated portions and to decrease the relative velocity of the metal foil when the inductive coil is opposed to the coated portions.

2. The apparatus according to claim 1 wherein the inductive coil is configured to generate a magnetic flux and is arranged such that the generated magnetic flux is transmitted through the metal foil in a direction perpendicular to the surface of the metal foil.

3. The apparatus according to claim 1 wherein the inductive coil includes an inductive heating portion extending transversely to the arrangement direction, and
    when the inductive heating portion approaches the border between the coated portions and the uncoated portions, the control unit reduces the amount of heat applied to the metal foil so that when the inductive heating portion is aligned with the uncoated portion, the amount of heat is less than the amount of heat applied when the inductive heating portion is aligned with the coated portion.

4. The apparatus according to claim 1 wherein the inductive coil includes at least a first inductive heating portion and a second inductive heating portion spaced apart from each other by a distance in the arrangement direction, and
    the distance between the first and second inductive heating portions is dimensioned such that the first and second inductive heating portions are aligned with respective different uncoated portions.

5. The apparatus according to claim 4 wherein the distance between the first and second inductive heating portions is a pitch multiplied by a natural number, wherein the electrode material portions are arranged according to the pitch.

6. The apparatus according to claim 1, further comprising:
an auxiliary inductive coil disposed opposite to the metal foil on a same side of the metal foil as the inductive coil and configured to inductively heat the metal foil; and
a power supply for supplying power to the auxiliary inductive coil;
wherein the inductive coil includes at least a first inductive heating portion and a second inductive heating portion extending transversely to the arrangement direction and spaced apart from each other by a distance in the arrangement direction;
wherein the distance between the first and second inductive heating portions is dimensioned such that when the first inductive heating portion is aligned with the uncoated portion the second inductive heating portion is aligned with the coated portion;
wherein the control unit is further configured to:
reduce the amount of heat applied to the metal foil when the first inductive heating portion is aligned with the uncoated portion to the amount of heat that is less than the amount of heat applied by the first inductive heating portion when aligned with the coated portion; and
control the power supply for the auxiliary inductive coil to cause a first region of the coated portion, with which the second inductive heating portion is aligned, to be heated by the auxiliary inductive coil when the auxiliary inductive coil is aligned with the first region of the coated portion.

7. The apparatus according to claim 6 wherein the amount of heat applied by the auxiliary inductive coil compensates for a reduced amount of heat applied to the coated portion by the second inductive heating portion when the first inductive heating portion is aligned with the uncoated portion.

8. The apparatus according to claim 6 wherein the auxiliary inductive coil includes at least a first auxiliary inductive heating portion and a second auxiliary inductive heating portion spaced apart from each other in a direction perpendicular to the surface of the metal foil; and wherein the apparatus further comprises:
a shield member configured to reduce a leakage magnetic flux by shielding at least one auxiliary inductive heating portion of the first auxiliary inductive heating portion of the auxiliary inductive coil and the second auxiliary inductive heating portion of the auxiliary inductive coil, the at least one auxiliary inductive heating portion being located at a distal side from the surface of the metal foil.

9. The apparatus according to claim 6 wherein the auxiliary inductive coil is located downstream of at least one inductive heating portion of the first inductive heating portion of the inductive coil and the second inductive heating portion of the inductive coil in the arrangement direction.

10. The apparatus according to claim 9 wherein the auxiliary inductive coil is located between the first inductive heating portion of the inductive coil and second inductive heating portion of the inductive coil.

11. The apparatus according to claim 1 wherein the electrode material is configured to form one of a cathode and an anode of a lithium-ion secondary battery.

12. The apparatus according to claim 1, wherein the control unit controls the conveyor by detecting an amount of metal foil taken up in a take-up roll using an encoder in a conveyor motor.

13. A method for drying an electrode material on a surface of a metal foil having a length greater than a width, the method comprising:
providing a conveyer configured to move at least one of the metal foil lengthwise relative to the inductive coil and the inductive coil along the length of the metal foil, wherein the electrode material is positioned intermittently along the length of the metal foil on a common side of the metal foil with an uncoated portion of the metal foil positioned between adjacent intermittent coated portions of metal foil to alternate between coated and uncoated portions lengthwise along the length of the metal foil, the electrode material and uncoated portion located in substantially the same plane;
positioning an inductive coil opposed to the metal foil;
supplying power from a power supply to the inductive coil;
moving at least one of the metal foil lengthwise relative to the inductive coil and the inductive coil along the length of the metal foil;
sensing a border between each uncoated portion and each coated portion using a sensor configured to detect a border between the uncoated portion and a coated portion of the metal foil; and
heating the metal foil with the inductive coil powered by the power supply, wherein heating is controlled with a control unit configured to:
control at least one of the conveyer and the power supply to reduce an amount of heat applied to the uncoated portions below an amount of heat applied to the coated portions based on the border detected by the sensor, wherein the control unit reduces the amount of heat applied to the uncoated portions below the amount of heat applied to the coated portions by controlling the power supply to reduce power supplied to the inductive coil when the inductive coil is opposed to the uncoated portions and increase power supplied to the inductive coil when the inductive coil is opposed to the coated portions and by controlling the conveyer to increase a relative velocity of the metal foil with respect to the inductive coil when the inductive coil is opposed to the uncoated portions and to decrease the relative velocity of the metal foil when the inductive coil is opposed to the coated portions.

* * * * *